(12) United States Patent
Madasu et al.

(10) Patent No.: US 11,319,793 B2
(45) Date of Patent: May 3, 2022

(54) NEURAL NETWORK MODELS FOR REAL-TIME OPTIMIZATION OF DRILLING PARAMETERS DURING DRILLING OPERATIONS

(71) Applicant: Landmark Graphics Corporation, Houston, TX (US)

(72) Inventors: Srinath Madasu, Houston, TX (US); Keshava Prasad Rangarajan, Sugar Land, TX (US); Nishant Raizada, Richmond, TX (US)

(73) Assignee: Landmark Graphics Corporation, Houston, TX (US)

( * ) Notice: Subject to any disclaimer, the term of this patent is extended or adjusted under 35 U.S.C. 154(b) by 81 days.

(21) Appl. No.: 16/616,795

(22) PCT Filed: Nov. 15, 2017

(86) PCT No.: PCT/US2017/061849
§ 371 (c)(1),
(2) Date: Nov. 25, 2019

(87) PCT Pub. No.: WO2019/040091
PCT Pub. Date: Feb. 28, 2019

(65) Prior Publication Data
US 2021/0148213 A1 May 20, 2021

Related U.S. Application Data

(60) Provisional application No. 62/548,274, filed on Aug. 21, 2017.

(51) Int. Cl.
*E21B 44/00* (2006.01)
*E21B 49/00* (2006.01)
(Continued)

(52) U.S. Cl.
CPC ............ *E21B 44/00* (2013.01); *E21B 49/003* (2013.01); *G06K 9/6256* (2013.01); *G06N 3/0454* (2013.01); *E21B 2200/22* (2020.05)

(58) Field of Classification Search
CPC ... E21B 2200/20; E21B 2200/22; E21B 44/00
See application file for complete search history.

(56) References Cited

U.S. PATENT DOCUMENTS 9,022,140 B2 * 5/2015 Marx ...................... E21B 49/00
175/24
9,359,881 B2 * 6/2016 DiSantis ................. E21B 44/00
(Continued)

FOREIGN PATENT DOCUMENTS

WO    WO 2015/060810 A1    4/2015

OTHER PUBLICATIONS

Bahdanau et al., "Neural Machine Translation by Jointly Learning to Align and Translate," *Conference Paper*, Sep. 1, 2014, 15 pages.
(Continued)

*Primary Examiner* — Tara Schimpf
(74) *Attorney, Agent, or Firm* — Haynes and Boone, LLP

(57) ABSTRACT

System and methods for optimizing parameters for drilling operations are provided. Real-time data including values for input variables associated with a current stage of a drilling operation along a planned well path are acquired. A neural network model is trained to produce an objective function defining a response value for at least one operating variable of the drilling operation. The response value for the operating variable is estimated based on the objective function produced by the trained neural network model. Stochastic optimization is applied to the estimated response value so as to produce an optimized response value for the operating variable. Values of controllable parameters are estimated for a subsequent stage of the drilling operation, based on the
(Continued)

optimized response value of the operating variable. The subsequent stage of the drilling operation is performed based on the estimated values of the controllable parameters.

20 Claims, 15 Drawing Sheets

(51) Int. Cl.
    *G06K 9/62*           (2022.01)
    *G06N 3/04*           (2006.01)

(56) References Cited

U.S. PATENT DOCUMENTS

| | | | |
|---|---|---|---|
| 9,587,478 B2 | 3/2017 | Moran et al. | |
| 2002/0120401 A1* | 8/2002 | Macdonald | E21B 44/005 702/6 |
| 2004/0256152 A1* | 12/2004 | Dashevskiy | E21B 44/00 175/25 |
| 2014/0116776 A1 | 5/2014 | Marx et al. | |
| 2015/0081222 A1 | 3/2015 | Laing et al. | |
| 2016/0273330 A1 | 9/2016 | Dashevsky et al. | |
| 2017/0017883 A1* | 1/2017 | Zhou | G06N 20/20 |
| 2017/0204689 A1 | 7/2017 | Dykstra et al. | |

OTHER PUBLICATIONS

Brochu, "Interactive Bayesian Optimization: Learning User Preferences for Graphics and Animation," *Thesis Submitted to the University of British Columbia*, Dec. 2010.

Chen et al., "Real-Time Optimization of Drilling Parameters Based on Mechanical Specific Energy for Rotating Drilling with Positive Displacement Motor in the Hard Formation," *Journal of Natural Gas Science and Engineering*, vol. 35, Part A, Sep. 2016, pp. 686-694.

Hamrick, "Optimization of Operating Parameters for Minimum Mechanical Specific Energy in Drilling," *Dissertation Submitted to College of Engineering and Mineral Resources Department of Mechanical and Aerospace Engineering at West Virginia University*, 2011.

International Search Report and Written Opinion issued for International Patent Application No. PCT/US2017/061849, dated May 18, 2018, 16 pages.

Mohan et al., "Tracking Drilling Efficiency Using Hydro-Mechanical Specific Energy," *SPE/IADC Drilling Conference and Exhibition*, Mar. 17-19, 2009. Amsterdam, the Netherlands.

Osgouei, "Rate of Penetration Estimation Model for Directional and Horizontal Wells," *Thesis Submitted to the Graduate School of Natural and Applied Sciences of Middle East Technical University*, Sep. 2007.

Payette et al., "A Real-Time Well-Site Based Surveillance and Optimization Platform for Drilling: Technology, Basic Workflows and Field Results," *SPE/IADC Drilling Conference and Exhibition*, Mar. 14-16, 2017, The Hague, The Netherlands.

Yao et al., "DeepSense: A Unified Deep Learning Framework for Time-Series Mobile Sensing Data Processing," *Research Paper*, Nov. 7, 2016, 9 pages.

Examination Report issued for United Kingdom Patent Application No. GB2000648.2, dated Feb. 9, 2022, 2 pages.

\* cited by examiner

NEURAL NETWORK MODELS FOR REAL-TIME OPTIMIZATION OF DRILLING PARAMETERS DURING DRILLING OPERATIONS

CROSS-REFERENCE TO RELATED APPLICATIONS

The present application is a U.S. National Stage patent application of International Patent Application No. PCT/US2017/061849, filed on Nov. 15, 2017, which claims priority to U.S. Provisional Application No. 62/548,274, filed on Aug. 21, 2017, the benefit of which is claimed and the disclosures of which are incorporated herein by reference in their entirety.

FIELD OF THE DISCLOSURE

The present disclosure relates generally to well planning and control during drilling operations and particularly, to real-time modeling and optimization of drilling parameters for well planning and control during drilling operations.

BACKGROUND

To obtain hydrocarbons, such as oil and gas, a wellbore is drilled into a hydrocarbon bearing rock formation by rotating a drill bit attached to a drill string. The drill bit is mounted on the lower end of the drill string as part of a bottomhole assembly (BHA) and is rotated by rotating the drill string at the surface, by actuation of a downhole motor, or both. With weight applied by the drill string, the rotating drill bit engages the formation and forms a borehole toward a target zone. During the drilling process, drilling fluids are circulated to clean the cuttings while the drill bit is penetrated through the formation.

A number of sensors or measurement devices may be placed in close proximity to the drill bit to measure downhole operating parameters associated with the drilling and downhole conditions. The measurements captured by such sensors may be transmitted to a computing device of a drilling operator at the surface of the borehole for purposes of monitoring and controlling the drilling of the wellbore along a planned path over different stages of a drilling operation. When making decisions for effectively planning and implementing a well plan, the drilling operator may need to constantly monitor and adjust various parameters to account for changes in downhole conditions as the wellbore is drilled through different layers of the formation. However, this may prove to be difficult due to the complexity of the underlying physics and engineering aspects of the drilling process in addition to the inherent uncertainty of the data captured at the surface and downhole.

DESCRIPTION OF ILLUSTRATIVE EMBODIMENTS

Figure 1:
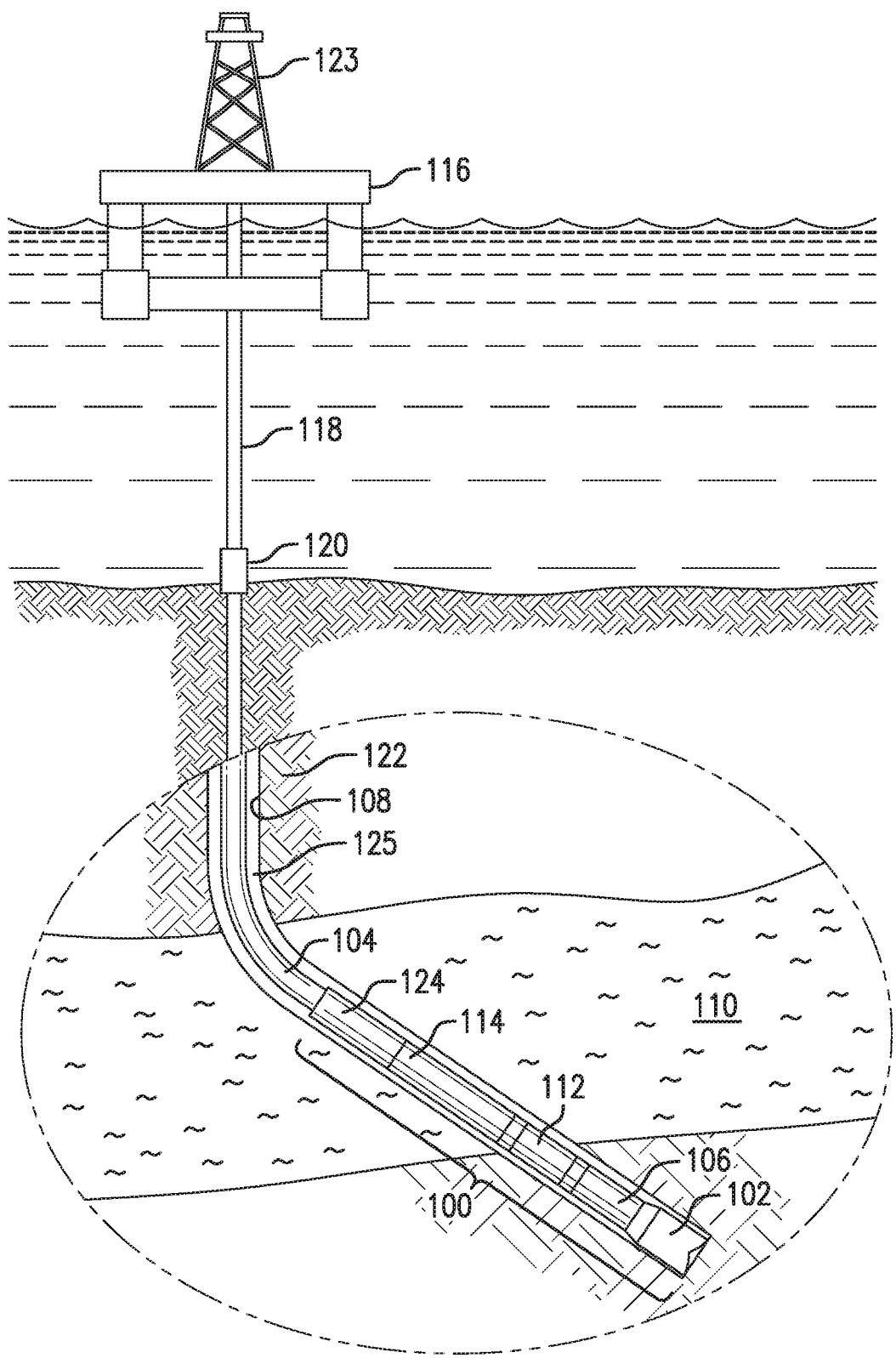
FIG. 1 is a diagram of an offshore drilling system in accordance with one or more embodiments of the present disclosure.

Embodiments of the present disclosure relate to using neural network models for real-time optimization of downhole parameters for drilling operations. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

The terms "controllable parameter" and "input variable" may be used interchangeably herein to refer to a controllable input or parameter of a drilling operation that may be adjusted over the course of the operation and whose values may have an impact on the outcome of the operation. The drilling operation may involve drilling a wellbore along a planned path or trajectory through different layers of a subsurface formation. Downhole operating conditions may change while the wellbore is drilled through the formation. As a result, a drilling operator or automated control system may continuously adjust one or more controllable parameters to account for such changes and thereby maintain or improve drilling efficiency during the operation. Examples of such controllable parameters include, but are not limited to, weight-on-bit (WOB), rotational speed of the drill bit or drill string (e.g., rotational rate applied by the top drive unit) in revolutions per minute (RPM), and an injection or pumping rate (Q) of drilling fluid into the wellbore or pipe disposed therein. Although "RPM" will be used herein to refer to drill bit rotation or rotational speed, it should be appreciated that such speed may be specified using any appropriate unit of measure as desired for a particular implementation.

In one or more embodiments, the controllable parameters may be used to control values of an "operating variable" of the drilling operation as it is performed downhole over different stages along a planned path of the wellbore through the formation. The operating variable may be selected by a user (e.g., a drilling operator) to monitor a particular downhole response as the drilling operation is performed along the well path, e.g., according to current values of the controllable parameters or input variables. Accordingly, the operating variable may also be referred to herein as a "response variable" of the drilling operation. Examples of such operating/response variables include, but are not limited to, hydraulic mechanical specific energy (HMSE) and rate of penetration (ROP). The controllable parameters (input variables) and operating/response variables are collectively referred to herein as "drilling parameters."

In one or more embodiments, a neural network model with stochastic optimization based on Bayesian optimization (BO) may be used to optimize one or more operating variables (or response variables) for each stage of the drilling operation, e.g., maximizing ROP and/or minimizing HMSE at different depths or points along the well path. As will be described in further detail below, real-time data, including the current values of one or more controllable parameters (e.g., WOB, RPM, and/or Q) at various depths along the well path, may be applied as inputs to the neural network model for predicting values of the response variable(s). The neural network model may be, for example, a sliding window neural network (SWNN). Alternatively, the neural network model may be a recurrent deep neural network (DNN) with one or more Gated Recurrent Unit (GRU) cells. However, it should be appreciated that any of various neural network models, e.g., long short-term memory (LSTM) deep neural network models, may also be used as desired for a particular implementation.

Illustrative embodiments and related methodologies of the present disclosure are described below in reference to FIGS. 1-13 as they might be employed in, for example, a computer system for real-time modeling and optimization of drilling parameters over different stages of a drilling operation along a planned well path. In some implementations, such a computer system may be part of an automated control system for steering a drill bit along the well path by mathematically coupling the neural network model with the real-time drilling data and various non-linear discontinuous constraints associated with the different stages of the drilling operation at various depths or points along the well path. For example, the drill bit may be steered in iterative manner as the real-time data is acquired over a period of time during each stage of the drilling operation. At each iteration over the time period, the real-time data acquired for a current stage of the operation may be applied as inputs for training or retraining the neural network model to estimate or predict the response variable for a subsequent stage along the well path. Bayesian optimization may be applied to optimize the predicted response variable. The optimized response variable may then be used to estimate or predict optimal values for one or more controllable parameters, and the subsequent stage of the drilling operation may be performed by steering the drill bit through the formation according to the estimated controllable parameter values. In this way, the system may iteratively steer the drill bit and adjust the well path as needed to optimize drilling efficiency, e.g., by maximizing ROP and/or minimizing HMSE.

Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. While the illustrated examples may be described in the context of predicting and optimizing ROP and/or HMSE, it should be noted that embodiments are not intended to be limited thereto and that the disclosed parameter optimization techniques may be applied to any of various operating variables as desired for a particular implementation. Also, while a figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Further, unless otherwise noted, even though a figure may depict a cased hole, it should be understood by those skilled in the art that the apparatus according to the present disclosure is equally well suited for use in open hole operations.

FIG. 1 is a diagram showing an example of an offshore drilling system for a subsea drilling operation. In particular, FIG. 1 shows a bottomhole assembly 100 for a subsea drilling operation, where the bottomhole assembly 100 illustratively comprises a drill bit 102 on the distal end of the drill string 104. Various logging-while-drilling (LWD) and measuring-while-drilling (MWD) tools may also be coupled within the bottomhole assembly 100. The distinction between LWD and MWD is sometimes blurred in the industry, but for purposes of this specification and claims LWD tools measure properties of the surrounding formation (e.g., resistivity, porosity, permeability), and MWD tools measure properties associated with the borehole (e.g., inclination, and direction). In the example system, a logging tool 106 may be coupled just above the drill bit, where the logging tool may read data associated with the borehole 108 (e.g., MWD tool), or the logging tool 106 may read data associated with the surrounding formation (e.g., a LWD tool). In some cases, the bottomhole assembly 100 may comprise a mud motor 112. The mud motor 112 may derive energy from drilling fluid flowing within the drill string 104 and, from the energy extracted, the mud motor 112 may rotate the drill bit 102 (and if present the logging tool 106) separate and apart from rotation imparted to the drill string by surface equipment. Additional logging tools may reside above the mud motor 112 in the drill string, such as illustrative logging tool 114.

The bottomhole assembly 100 is lowered from a drilling platform 116 by way of the drill string 104. The drill string 104 extends through a riser 118 and a well head 120. Drilling equipment supported within and around derrick 123 (illustrative drilling equipment discussed in greater detail with respect to FIG. 2) may rotate the drill string 104, and the rotational motion of the drill string 104 and/or the rotational motion created by the mud motor 112 causes the bit 102 to form the borehole 108 through the formation material 122. The volume defined between the drill string 104 and the borehole 108 is referred to as the annulus 125. The borehole 108 penetrates subterranean zones or reservoirs, such as reservoir 110, believed to contain hydrocarbons in a commercially viable quantity.

The bottomhole assembly 100 may further comprise a communication subsystem including, for example, a telemetry module 124. Telemetry module 124 may communicatively couple to the various logging tools 106 and 114 and receive logging data measured and/or recorded by the logging tools 106 and 114. The telemetry module 124 may communicate logging data to the surface using any suitable communication channel (e.g., pressure pulses within the drilling fluid flowing in the drill string 104, acoustic telemetry through the pipes of the drill string 104, electromagnetic telemetry, optical fibers embedded in the drill string 104, or combinations). Likewise, the telemetry module 124 may receive information from the surface over one or more of the communication channels.

Figure 2:
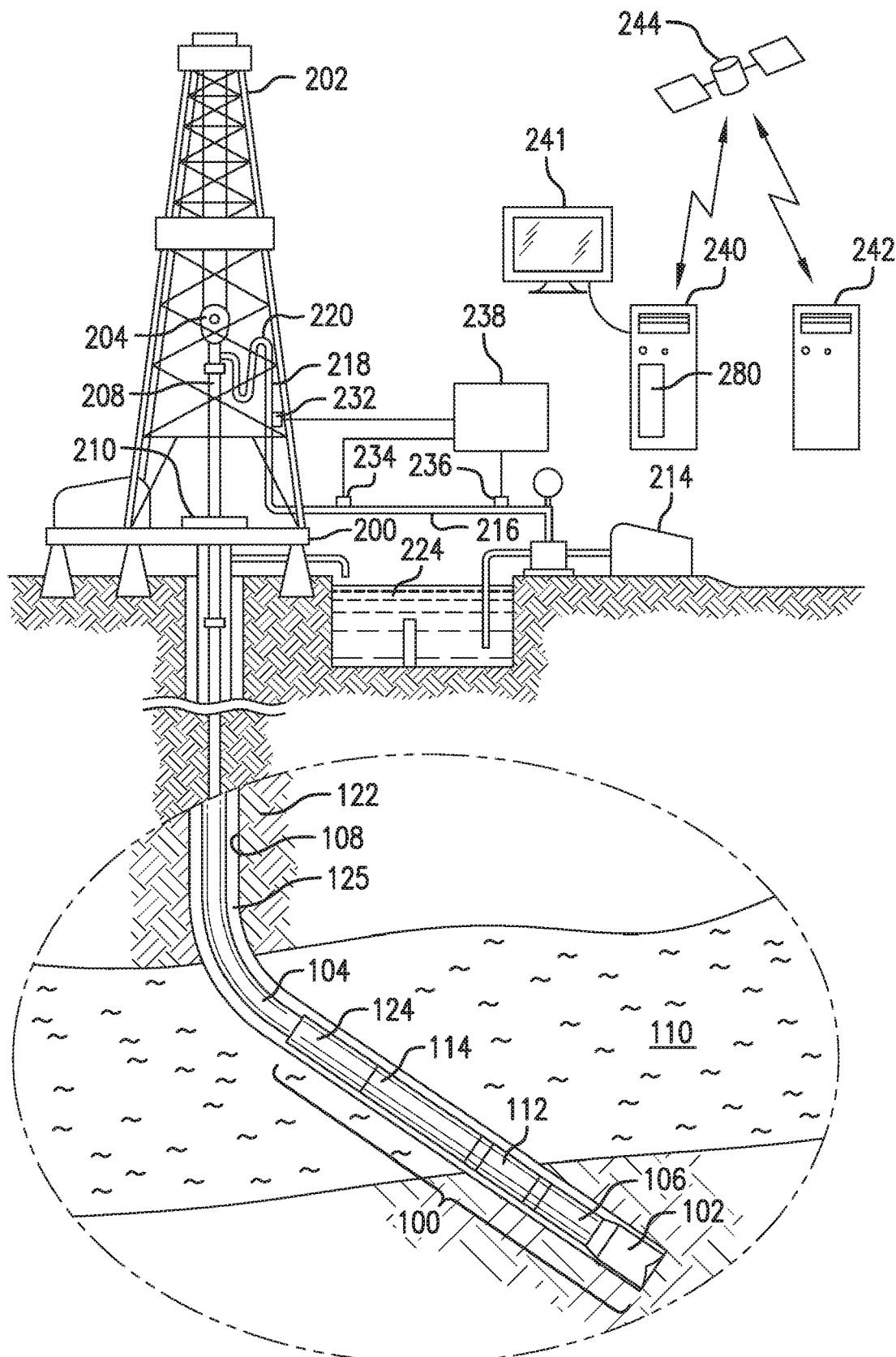
FIG. 2 is a diagram of an onshore drilling system in accordance with one or more embodiments of the present disclosure.

FIG. 2 is a diagram showing an example of an onshore drilling system for performing a land-based drilling operation. In particular, FIG. 2 shows a drilling platform 200 equipped with a derrick 202 that supports a hoist 204. The hoist 204 suspends a top drive 208, which rotates and lowers the drill string 104 through the wellhead 210. Drilling fluid is pumped by mud pump 214 through flow line 216, stand pipe 218, goose neck 220, top drive 208, and down through the drill string 104 at high pressures and volumes to emerge through nozzles or jets in the drill bit 102. The drilling fluid then travels back up the wellbore via the annulus 125, through a blowout preventer (not specifically shown), and into a mud pit 224 on the surface. At the surface of the wellsite, the drilling fluid is cleaned and then circulated again by mud pump 214. The drilling fluid is used to cool the drill bit 102, to carry cuttings from the base of the borehole to the surface, and to balance the hydrostatic pressure in the rock formations.

In the illustrative case of the telemetry mode 124 encoding data in pressure pulses that propagate to the surface, one or more transducers, e.g., one or more of transducers 232, 234, and 236, convert the pressure signal into electrical signals for a signal digitizer 238 (e.g., an analog-to-digital converter). While only transducers 232, 234, and 236 are illustrated, any number of transducers may be used as desired for a particular implementation. The digitizer 238 supplies a digital form of the pressure signals to a surface computer system 240 or some other form of a data processing device located at the surface of the wellsite. The surface computer system 240 operates in accordance with computer-executable instructions (which may be stored on a computer-readable storage medium) to monitor and control the drilling operation, as will be described in further detail below. Such instructions may be used, for example, to configure the surface computer system 240 to process and decode the downhole signals received from the telemetry mode 124 via digitizer 238.

In one or more embodiments, real-time data collected at the wellsite, including the downhole logging data from the telemetry module 124, may be displayed on a display device 241 coupled to the computer system 240. The representation of the wellsite data may be displayed using any of various display techniques, as will be described in further detail below. In some implementations, the surface computer system 240 may generate a two-dimensional (2D) or three-dimensional (3D) graphical representation of the wellsite data for display on the display device 241 a graphic. The graphical representation of the wellsite data may be displayed with a representation of the planned well path for enabling a user of the computer system 240 to visually monitor or track different stages of the drilling operation along the planned path of the well.

In one or more embodiments, the representations of the wellsite data and planned well path may be displayed within a graphical user interface (GUI) of a geosteering or well engineering application 280 executable at the surface computer system 240. Well engineering application 280 may provide, for example, a set of data analysis and visualization tools for well planning and control. Such tools may allow the user to monitor different stages of the drilling operation and adjust the planned well path as needed, e.g., by manually adjusting one or more controllable parameters via the GUI of well engineering application 280 to control the direction and/or orientation of drill bit 102 and well path. Alternatively, the monitoring and control of the drilling operation may be performed automatically, without any user intervention, by well engineering application 280.

For example, as each stage of the drilling operation is performed and a corresponding portion of the well is drilled along its planned path, well engineering application 280 may receive indications of downhole operating conditions and values of controllable parameters used to control the drilling of the well during the operation. Examples of such controllable parameters include, but are not limited to, WOB, drilling fluid injection or flow rate and pressure (within the drill pipe), rotational speed of the drill string and/or drill bit (e.g., rotational rate applied by the top drive unit and/or a downhole motor), and the density and viscosity of the drilling fluid. In response to receiving indications of downhole operating conditions during a current stage of the drilling operation, the surface computer system 240 may automatically send control signals to one or more downhole devices (e.g., a downhole geosteering tool) in order to adjust the planned path of the well for subsequent stages of the operation. The control signals may include, for example, optimized values of one or more controllable parameters for performing the subsequent stages of the drilling operation along the adjusted path of the well.

In one or more embodiments, some or all of the calculations and functions associated with the manual or automated monitoring and control of the drilling operation at the wellsite may be performed by a remote computer system 242 located away from the wellsite, e.g., at an operations center of an oilfield services provider. In some implementations, the functions performed by the remote computer system 242 may be based on wellsite data received from the wellsite computer system 240 via a communication network. Such a network may be, for example, a local-area, medium-area, or wide-area network, e.g., the Internet. As illustrated in the example of FIG. 2, the communication between computer system 240 and computer system 242 may be over a satellite 244 link. However, it should be appreciated that embodiments are not limited thereto and that any suitable form of communication may be used as desired for a particular implementation.

While not shown in FIG. 2, the remote computer system 242 may execute a similar application as the well engineering application 280 of system 240 for implementing all or a portion of the above-described wellsite monitoring and control functionality. For example, such functionality may be implemented using only the well engineering application 280 executable at system 240 or using only the well engineering application executable at the remote computer system 242 or using a combination of the well engineering applications executable at the respective computer systems 240 and 242 such that all or portion of the wellsite monitoring and control functionality may be spread amongst the available computer systems.

In one or more embodiments, the wellsite monitoring and control functionality provided by computer system 242 (and computer system 240 or well engineering application 280 thereof) may include real-time analysis and optimization of parameters for different stages of the drilling operation along the planned well path, as described above and as will be described in further detail below with respect to FIGS. 3-15. While the examples of FIGS. 1 and 2 are described in the context of a single well and wellsite, it should be appreciated that embodiments are not intended to be limited thereto and that the real-time analysis and optimization techniques disclosed herein may be applied to multiple wells at various sites throughout a hydrocarbon producing field. For example, the remote computer system 242 of FIG. 2, as described above, may be communicatively coupled via a communication network to corresponding wellsite computer systems similar to the computer system 240 of FIG. 2, as described above. The remote computer system 242 in this example may be used to continuously monitor and control drilling operations at the various wellsites by sending and receiving control signals and wellsite data to and from the respective wellsite computer systems via the network.

Figure 3:
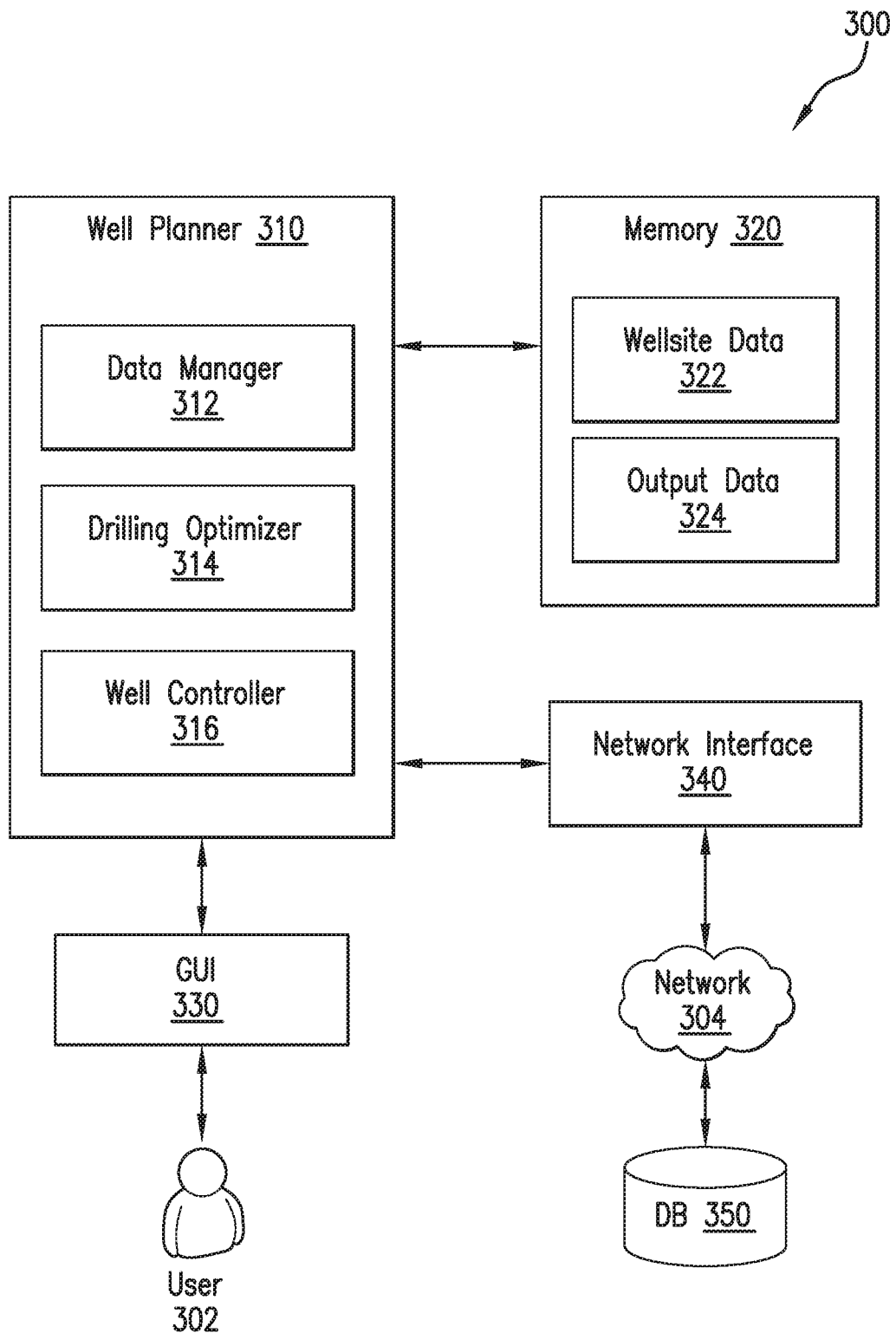
FIG. 3 is a block diagram of a system for real-time analysis and optimization of downhole parameters for well planning and control during a drilling operation.

FIG. 3 is a block diagram of a system 300 for real-time analysis and optimization of parameters for different stages of a drilling operation. The drilling operation may be, for example, a subsea drilling operation for drilling a wellbore along a planned path through a subsurface formation at an offshore wellsite, as described above with respect to FIG. 1. Alternatively, the drilling operation may be a land-based drilling operation for drilling the wellbore along a planned path through a subsurface formation at an onshore wellsite, as described above with respect to FIG. 2. As shown in FIG. 3, system 300 includes a well planner 310, a memory 320, a graphical user interface (GUI) 330, and a network interface 340. In one or more embodiments, the well planner 310 includes a data manager 312, a drilling optimizer 314, and a well controller 316. Although not shown in FIG. 3, it should be appreciated that system 300 may include additional components and sub-components, which may be used to provide the real-time analysis and optimization functionality described herein.

The network interface 340 of the system 300 may comprise logic encoded in software, hardware, or combination thereof for communicating with a network 304. For example, the network interface 340 may include software supporting one or more communication protocols such that hardware associated with the network interface 340 is operable to communicate signals to other computing systems and devices via the network 304. The network 304 may be used, for example, to facilitate wireless or wireline communications between the system 300 and the other computing systems and devices. In some implementations, the system 300 and the other systems and devices may function as separate components of a distributed computing environment in which the components are communicatively coupled via the network 304. While not shown in FIG. 3, it should be appreciated that such other systems and devices may include other local or remote computers including, for example and without limitation, one or more client systems, servers, or other devices communicatively coupled via the network 304.

The network 304 may be one or any combination of networks including, but not limited to, a local-area, medium-area, or wide-area network, e.g., the Internet. Such network(s) may be all or a portion of an enterprise or secured network. In some instances, a portion of the network 304 may be a virtual private network (VPN) between, for example, system 300 and other computers or other electronic devices. Further, all or a portion of the network 304 can include either a wireline or wireless link. Examples of such wireless links include, but are not limited to, 802.11a/b/g/n, 802.20, WiMax, and/or any other appropriate wireless link. The network 304 may encompass any number of internal (private) or external (public) networks, sub-networks, or combination thereof to facilitate communications between various computing components including the system 300.

In one or more embodiments, the system 300 may use the network 304 to communicate with a database 350. The database 350 may be used to store data accessible to the system 300 for performing the real-time modeling and geosteering functionality described herein. The database 350 may be associated with or located at the operations center of an oilfield services provider, as described above with respect to computer system 242 of FIG. 2. The stored data may include, for example, historical wellsite data and parameters associated with drilling operations at various wellsites, e.g., other wellsites within the same hydrocarbon producing field as the wellsite in this example. Additionally or alternatively, the data may include data collected in real-time from the wellsite during the different stages of the drilling operation. Such real-time data may be retrieved from the database 350 via the network 304 and stored within memory 320 as wellsite data 322, e.g., to be retrieved and applied as input data for performing the real-time modeling and optimization techniques disclosed herein. In some implementations, the data may be streamed from the database 350 as a real-time data feed to a designated buffer or storage area corresponding to wellsite data 322 within memory 320.

In one or more embodiments, the wellsite data 322 may include data transmitted via network 304 directly from a surface control system (e.g., surface computer system 240 of FIG. 2, as described above) at a drilling rig or offshore platform using an industrial format such as the wellsite information transfer standard markup language (WITSML). WITSML is known to facilitate the free flow of technical data across networks between oil companies, service companies, drilling contractors, application vendors and regulatory agencies for the drilling, completions, and interventions functions of the upstream oil and natural gas industry. However, it should be appreciated that the wellsite data 322 can be transmitted and stored using any type of data format, standard, or structure as desired for a particular implementation.

The stored wellsite data 322 may include current values of controllable parameters, e.g., flow rate (Q), weight on bit (WOB), and drill bit rotational speed (RPM). However, it should be appreciated that the wellsite data 322 may also include any of various measurements or other data collected at the wellsite. Examples of such other data include, but are not limited to, depth (vertical depth within the formation and/or measured depth of the wellbore, whether vertical or deviated), bit size, drill collar length, torque and drag on the string, plastic viscosity, yield point, mud weight, gel strength, downhole pressure, and temperature.

In one or more embodiments, the data manager 312 of well planner 310 may preprocess the stored wellsite data 322 or real-time data feed received via the network 304 from the database 350 or a wellsite computer system. The preprocessing may include, for example, filtering the data into a predetermined sampling rate or drilling rate time series. In some implementations, the data manager 312 may include one or more data filters for reducing or canceling noise from the real-time data. Examples of such filters include, but are not limited to, a convolution neural network, a band-pass filter, a Kalman filter, a high pass filter, a low pass filter, an average filter, a noise reduction filter, a delay filter, a summation filter, a format conversion filter, and any other type of digital or analog data filters. The preprocessed data may then be classified for use in prediction and optimization of one or more operating variables and controllable parameters for different stages of the drilling operation, as will be described in further detail below.

In one or more embodiments, at least one operating variable of interest may be selected by a user 302 via the GUI 330. The operating variable selected by user 302 may be, for example, at least one of ROP or HMSE. The operating variable(s) selected by user 302 in this example may be used to monitor drilling efficiency and trends in the performance of the drilling operation as the wellbore is drilled through the formation. In one or more embodiments, a visualization of estimated values of the operating variable and/or controllable parameters affecting the operating variable may be presented to the user 302 via a visualization window or content viewing area of the GUI 330. The GUI 330 may be displayed using any type of display device (not shown) coupled to system 300. Such a display device may be, for example and without limitation, a cathode ray tubes (CRT), liquid crystal displays (LCD), or light emitting diode (LED) monitor. The user 302 may interact with the GUI 330 using an input device (not shown) coupled to the system 300. The user input device may be, for example and without limitation, a mouse, a QWERTY or T9 keyboard, a touchscreen, a stylus or other pointer device, a graphics tablet, or a microphone. In some implementations, the user 302 may use the information displayed via the GUI 330 to assess drilling performance at each stage of the operation and make any manual adjustments to the planned path of the well, e.g., by entering appropriate commands into a drilling operation control module used to control the drilling operations at the wellsite. However, it should be appreciated that such adjustments may be made automatically by an automated control system for the wellsite.

During the drilling operation, drilling fluids are pumped into the wellbore to remove the cuttings produced while the drill bit penetrates subsurface rock layers and forms the wellbore within the subsurface formation. The major physical and engineering aspects of the drilling process can be very complex and any wellsite data collected as the wellbore is drilled often includes a significant amount of noise and uncertainty. As a result, the response surface for operating variables, such as ROP and HMSE, tends to be non-linear and discontinuous.

In one or more embodiments, drilling optimizer 314 may use a neural network model with stochastic optimization to estimate or predict optimal values for both the selected operating variable(s) and controllable parameters of the drilling operation that affect the operating variable(s) during the operation. Such a stochastic-based approach may provide a level of accuracy and speed needed to perform real-time applications, e.g., real-time modeling and geosteering, in relatively short period of time for optimizing the path of the wellbore as it is drilled in a localized region of the formation over each stage of the drilling operation. An example of a neural network model with stochastic optimization is shown in FIG. 4.

Figure 4:
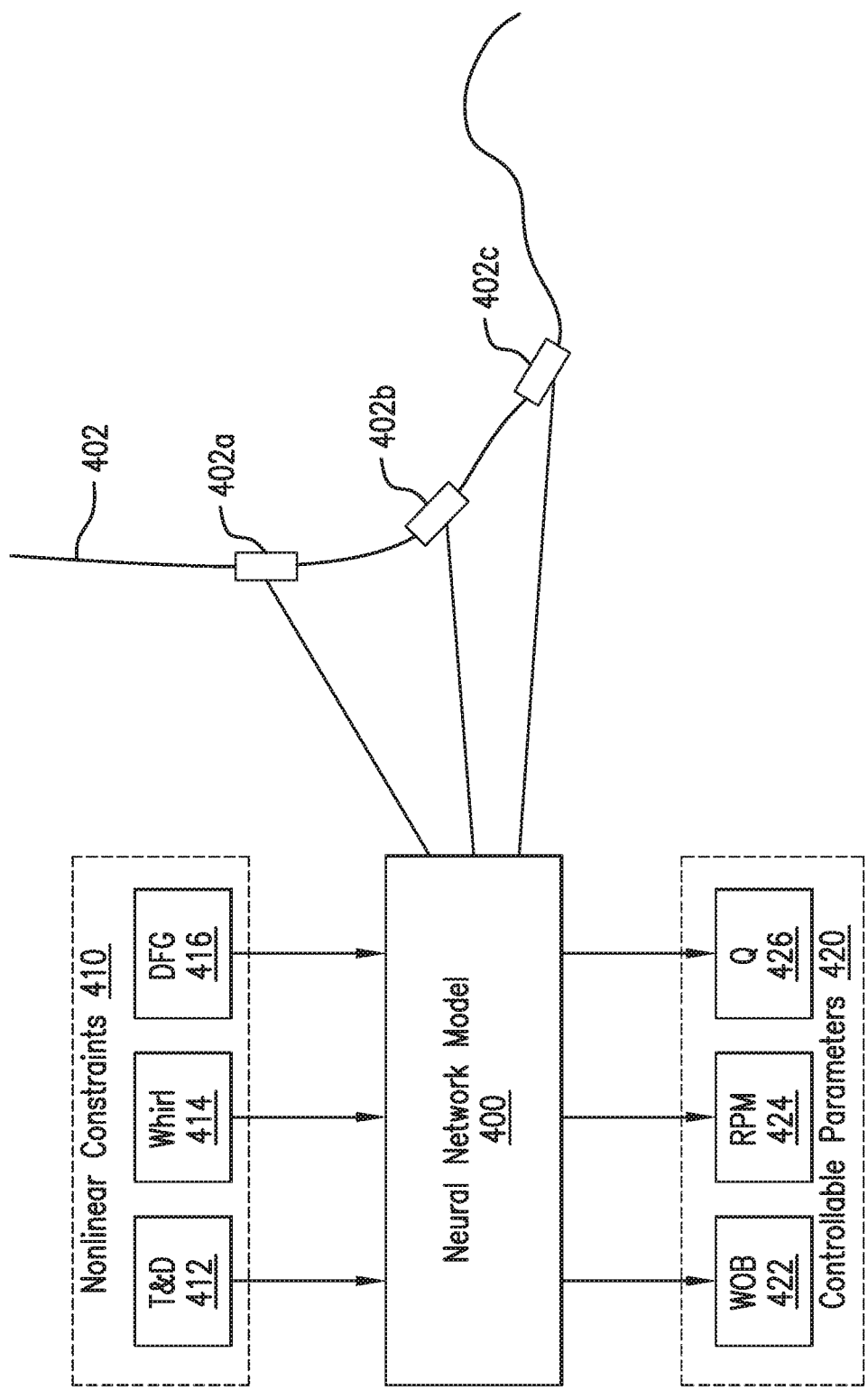
FIG. 4 is a diagram of an illustrative neural network model for optimizing parameters for a drilling operation along a planned well path based on non-linear constraints applied to the model over different stages of the operation.

In FIG. 4, a neural network model 400 may use stochastic optimization to optimize at least one operating variable (e.g., maximize ROP and/or minimize HMSE) at each of a plurality of stages 402a, 402b, and 402c of a drilling operation along a well path 402. Each stage may correspond to an interval or section of well path 402 along which a portion of a wellbore is drilled through a subsurface formation. While three stages are shown in FIG. 4, it should be appreciated that the drilling operation may include any number of stages. It should also be appreciated that each stage of the operation may be of any length or size and that the overall spacing of the stages along well path 402 may be customized or configured as desired for a particular implementation. For example, in some implementations, each stage of the drilling operation may be performed over a predetermined length or depth interval (e.g., 30 feet) along the well path and the stages may be located adjacently to one another.

While the drilling operation is performed along well path 402, a drilling operator or automated control system at the wellsite may adjust the values of one or more controllable parameters, e.g., WOB, RPM, and Q, to account for changes in drilling conditions. The value of the operating variable may also change in response to the changes made to the controllable parameters. Accordingly, the operating variable in this context may be referred to as a response variable and a value of the operating variable as a response value. In one or more embodiments, real-time data including current values of the controllable parameters may be collected at the wellsite during each of stages 402a, 402b, and 402c. The real-time data may be multidimensional temporal data, e.g., drilling data samples captured with depth over a time series, which may correspond to the drilling rate. Neural network model 400 may be used to couple the depth data with nonlinear constraints to resolve the time and spatial variation of the response variable during the drilling operation.

In one or more embodiments, the values of the controllable parameters associated with a current stage (e.g., 402a) of the drilling operation may be applied as input variables for training neural network model 400 to produce an objective function defining a response value for the operating variable to be optimized for a subsequent stage (e.g., 402b and/or 402c) of the operation. For example, the objective function may define a response value for ROP in terms of WOB, RPM, and Q, as expressed using Equation (1):

$$ROP = f(WOB, RPM, Q) \tag{1}$$

The objective function in this context may be a cost function, which can be maximized or minimized depending on the particular operating variable of interest, e.g., maximized for ROP and minimized for HMSE.

To account for any high levels of nonlinearity and/or noise in the real-time or drilling rate time series data, the objective function produced by neural network model 400 for defining the response value of the operating variable may be subject to a set of nonlinear constraints 410. Nonlinear constraints 410 may be derived from data models representing different aspects of the drilling operation that may be associated with certain values of the controllable parameters and that may impact the response value of the operating variable to change over the course of the drilling operation. The data models in this example may include, but are not limited to, a torque and drag ("T&D") model 412, a whirl model 414, and a drilling fluid model ("DFM") 416.

In one or more embodiments, simulations for determining the appropriate constraints may be performed by applying the real-time data acquired during the operation as inputs to each of these models. For example, torque and drag model 412 may be used to simulate forces exerted on the drill bit by friction with the subterranean formation in which the wellbore is being formed. Torque and drag model 412 may therefore provide a threshold on the WOB to avoid excessive wear that can lead to failure of the drill bit or other components of the drilling assembly attached to the end of the drill string. Whirl model 414 may be used to simulate vibrational forces in the drill string that may cause damage at certain RPM values. As RPM values can change with the length and depth of the drill string, whirl model 414 may be used to constrain the RPM to safe value ranges that avoid excess vibration at a given WOB. Drilling fluid model 416 may be used to simulate the injection of drilling fluid (e.g., mud) used to remove cuttings or debris from the wellbore during the drilling operation. The ROP of the drill bit may be limited by the maximum amount of debris that can be removed from the wellbore by fluid injection or pumping over a given period of time. Thus, drilling fluid model 416 may provide a maximum fluid injection or pumping rate at which debris-filled fluid can be removed from the wellbore.

Neural network model 400 with the constraints applied to the objective function, as described above, may then be used to estimate or predict a response value for the operating variable to be optimized for a subsequent stage of the drilling operation along well path 402. In one or more embodiments, stochastic optimization, e.g., Bayesian optimization, may be applied to the response value to produce an optimized response value.

Figure 5:
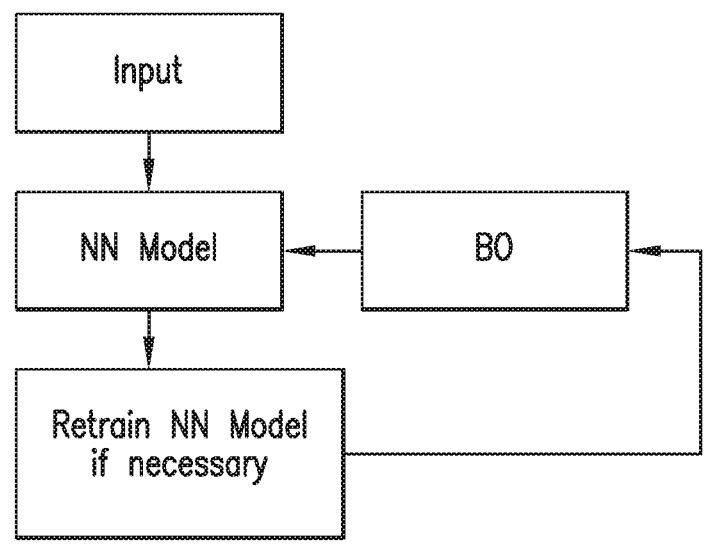
FIG. 5 is a schematic of a neural network model with real-time data inputs and Bayesian optimization for training or retraining the model.

As shown in FIG. 5, Bayesian optimization (BO) may be applied iteratively to retrain a neural network model as necessary to meet a predetermined criterion. Such a criterion may be, for example, an error tolerance threshold, and the neural network model may be retrained each time it is determined that a difference between the estimated response value and an actual value of the operating variable exceeds the threshold. The actual value of the operating variable may be based on additional real-time data acquired during a subsequent stage of the drilling operation. In one or more embodiments, the neural network model may be retrained by applying the Bayesian optimization to one or more hyperparameters of the model. Examples of such hyperparameters include, but are not limited to, the number of layers of the neural network, the number of nodes in each layer, the learning rate of decay and any other parameter that relates to the behavior and/or capacity of the model.

Returning to FIG. 4, the optimized response value produced by neural network model 400 may then be used to predict or estimate optimal values of controllable parameters 420. Controllable parameters 420 in this example may include, but are not limited to, WOB 422, drill bit speed (or RPM) 424, and flow rate (Q) 426. Flow rate 426 may be the rate at which fluid (e.g., mud) is pumped into the wellbore.

Returning to system 300 of FIG. 3, the above-described modeling and simulation operations for optimizing the response value and controllable parameter values using neural network model 400 may be performed by drilling optimizer 314, based on the real-time data acquired and preprocessed by data manager 312. The response value and/or values of the controllable parameters may be stored as output data 324 within the memory 320.

In one or more embodiments, drilling optimizer 314 may provide the estimated values of the controllable parameters to well controller 316 of the well planner 310 for performing one or more stages of the drilling operation at the wellsite. The well controller 316 may provide the parameter values as control inputs to a downhole geosteering tool (not shown), which may be used to steer the drill bit and wellbore along a planned or adjusted path through the formation. For example, the well controller 316 may be communicatively coupled to the downhole geosteering tool via a wireless or wired (e.g., wireline) communication interface (not shown) of the system 300. Such a communication interface may be used by the well controller 316 to transmit the controllable parameter values as control signals to the downhole geosteering tool. The control signals may allow the well controller 316 to control, for example, the direction and orientation of the geosteering tool and thereby, adjust the planned path of the well during the drilling operation.

As the operation is performed along the planned well path, additional wellsite data may be collected by a downhole sensors (e.g., within downhole tool 106 of FIGS. 1 and 2, as described above), measurement devices at the surface of the wellbore or a combination of both. Such data may include, for example and without limitation, current values of controllable parameters, e.g., WOB, RPM and Q. However, it should be appreciated that the collected data may also include formation property measurements and other data related to the downhole operation in progress. As described above, such wellsite data may be obtained either directly or indirectly by system 300 via the network 304. In one or more embodiments, the drilling optimizer 314 may use such additional data to automatically update and further optimize the response value of the selected operating variable(s) (e.g., ROP and/or HMSE) for subsequent stages of the operation along the well path.

In one or more embodiments, the neural network model used by drilling optimizer 314 to estimate the response value of the operating variable and values of the controllable parameters, as described above, may be at least one of a sliding window neural network (SWNN) or a recurrent deep neural network (DNN).

Figure 6:
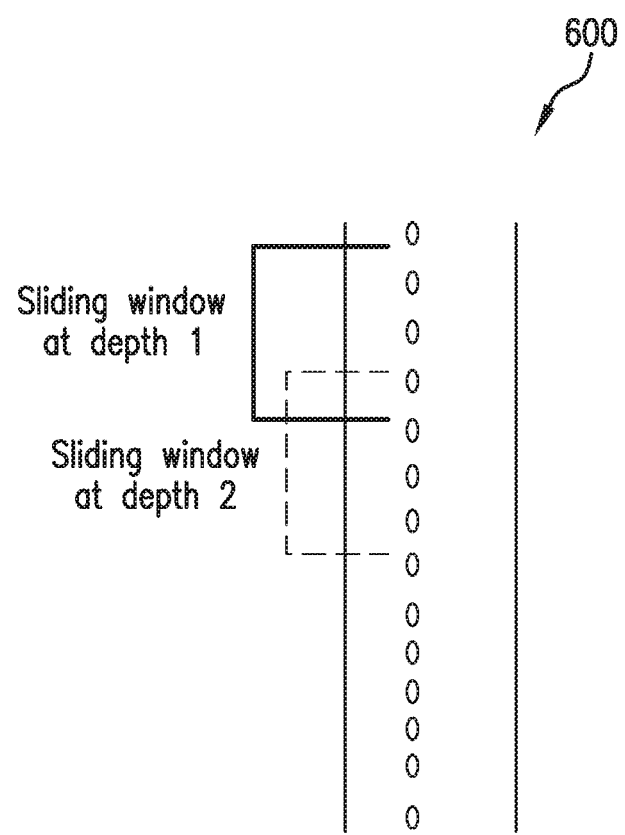
FIG. 6 is a schematic of a sliding window neural network (SWNN) for predicting values of one or more operating variables of a drilling operation along a well path.

FIG. 6 is a schematic of a sliding window neural network (SWNN) 600 for predicting values of one or more operating variables of a drilling operation along a well path. SWNN 600 may be used to predict a response value for at least one operating variable, e.g., ROP and/or HMSE. SWNN 600 may be trained using multivariate time-series data acquired during a drilling operation along the well path. Such drilling data may include real-time data sampled over a sliding window of SWNN 600, as shown in FIG. 6. The sliding window of SWNN 600 may be a sampling interval of any size or length along the well path. For example, the sliding window may correspond to a predetermined depth interval (e.g., 30 feet) that SWNN 600 may use to incrementally sample real-time data by sliding the window along the depth of the wellbore, e.g., by moving the position of the window between different depth increments along the well path. The size of the sliding window or sampling interval may correspond to a stage of the drilling operation or a portion of an entire stage. In one or more embodiments, the real-time drilling data acquired over a first portion of the sliding window (e.g., the first 24 feet) along the well path may be used to train SWNN 600 and the data acquired over the remaining portion (e.g., 6 feet) may be used for testing or validating the trained model to determine whether any retraining is necessary.

Figure 7:
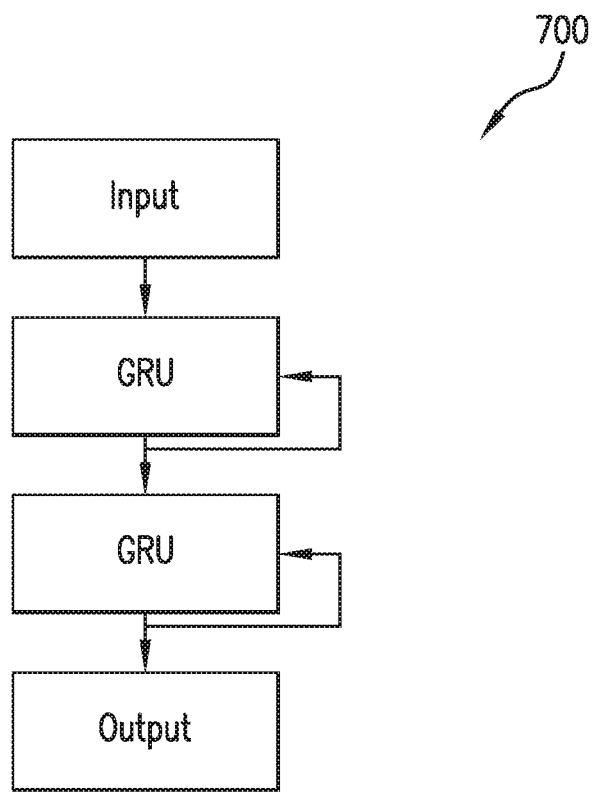
FIG. 7 is a schematic of a recurrent deep neural network (DNN) with one or more Gated Recurrent Unit (GRU) cells for predicting values of one or more operating variables of a drilling operation along a well path.

FIG. 7 is a schematic of a recurrent deep neural network (DNN) 700 with one or more Gated Recurrent Unit (GRU) cells for predicting values of one or more operating variables of a drilling operation along a well path. However, it should be appreciated that the disclosed embodiments are not intended to be limited to GRU cells and that the disclosed techniques may be applied using recurrent DNN with other types of cells, e.g., Long Short Term Memory (LSTM) cells. Like SWNN 600 of FIG. 6, DNN 700 may be trained using multivariate time-series drilling data acquired along the well path. A portion of the acquired data may be used for training DNN 700 while the remaining portion may be used for testing and validation of the trained model. As shown in FIG. 7, DNN 700 in this example may include multiple GRU cells in a stacked configuration, where each GRU cell in the stack may represent a layer of DNN 700 in which DNN 700 may be trained in an iterative manner over a series of time steps.

Figure 8:
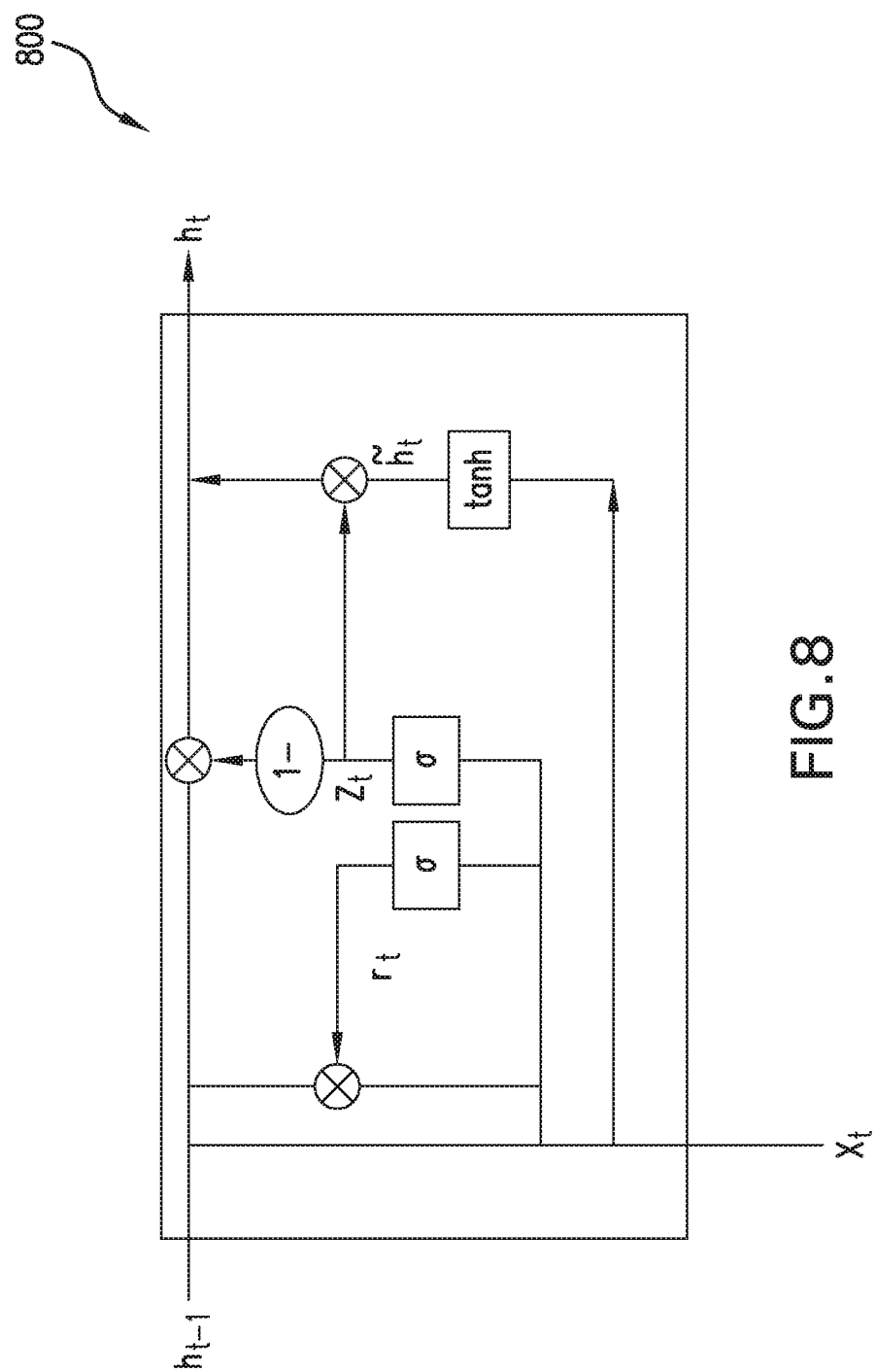
FIG. 8 is a schematic of an illustrative GRU cell of the DNN shown in FIG. 7.

FIG. 8 is a schematic of an illustrative GRU cell 800 of DNN 700 as shown in FIG. 7. The rectangular boxes denote layers in GRU cell 800, which have weights and biases associated with it. Circle and elliptical shapes denote mathematical operations. In the schematic representation of GRU cell 800 as depicted in FIG. 8, $h_{t-1}$ may be the cell state or output ROP from a previous time step t−1, also expressed as $ROP_{t-1}$. The term $x_t$ may represent the multivariate input for the current time-step, which includes WOB ($r_{wob}$,t), RPM ($r_{rpm}$,t) and Q ($r_q$,t) from the current and previous time steps within a predefined look-up window of GRU cell 800.

GRU cell 800 in this example may have four layers, each of which may have weights and biases associated therewith. These weights and biases may be trained during the training process to provide optimal predictions of the treatment pressure in the time series. The variables f, i, and o may correspond to values for "forget", "input", and "output" gates. These gates may involve calculations based on a sigmoid function (σ), where resulting values fall within the range [0, 1]. The resulting values may define how much of the information should be passed from the previous time step to next time step.

In one or more embodiments, a set of mathematical operations, as expressed by Equations (2)-(6) below, may be performed to calculate a state of GRU cell 800 or output ROP at each time step t, i.e., $h_t$ ($ROP_t$):

$$x_t = [r_{wob,t}, r_{rpm,t}, r_{q,t}] \quad (2)$$

$$z_t = \sigma(W_z \cdot [h_{t-1}, x_t]) \quad (3)$$

$$r_t = \sigma(W_r \cdot [h_{t-1}, x_t]) \quad (4)$$

$$\tilde{h}_t = \sigma(W \cdot [r_t * h_{t-1}, x_t]) \quad (5)$$

$$h_t = (1-z_t) * h_{t-1} + z_t * \tilde{h}_t \quad (6)$$

where $ROP_t$ denotes the predicted ROP at time step t; x is the input for each time step, is which may include WOB ($r_{wob}$,t), RPM ($r_{rpm}$,t) and Q ($r_q$,t) values that are shared by all stacked layers; $z_t$ is the update gate vector; $W_z$ represents the weights of the update gate; $r_t$ is the reset gate vector; $W_r$ represents the weights of the reset gate; $\tilde{h}_t$ is the output of Equation (5) and serves as an intermediate value used in Equation (6) to calculate the final output $h_t$; and W represents weights for the final output.

Returning to DNN 700 of FIG. 7, Equations (2)-(6) above may be used to calculate a state of each GRU cell or output ROP (e.g., a predicted response value for the ROP) at each time step. In one or more embodiments, the cell state and output ROP from an individual layer of DNN 700 may be passed from one time step to the next in the same layer and thereby provide the basis for input formulation at the next time step. A final predicted ROP may be obtained by combining the predicted ROP values from all stacked layers at a given time step. The stacked GRU configuration and other variants of DNN 700 may help in capturing highly non-linear variations in the time series data acquired during the drilling operation. This makes such recurrent DNNs an ideal choice in the prediction of ROP during drilling, especially given the highly nonlinear nature of the ROP time series.

Figure 9:
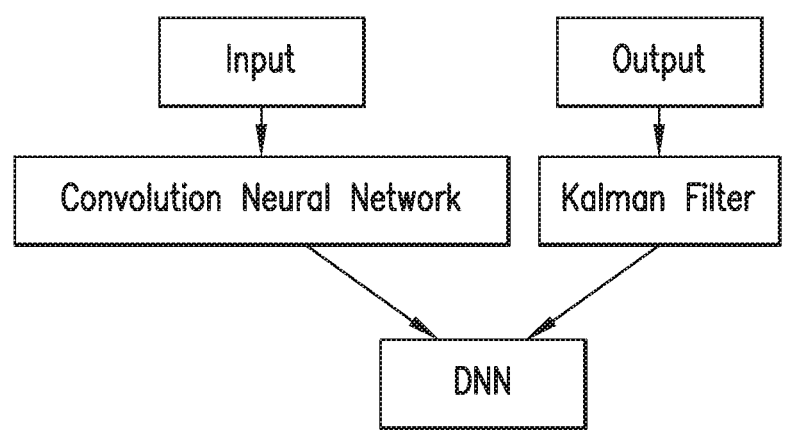
FIG. 9 is a diagram of an illustrative recurrent DNN architecture for filtering noise from the real-time data used to train the recurrent DNN.

In some implementations, DNN 700 may incorporate a root-mean-square error loss and back propagation through time (BPTT) architecture. An example of such a recurrent DNN architecture is shown in FIG. 9. In FIG. 9, input data for the recurrent DNN is passed to a Convolution Neural Network (CNN) to filter noise. A previous output of the DNN, e.g., a response value of the operating variable that was estimated during a previous stage of the drilling operation or that was acquired from an external source, such as an offset well, is passed to a noise filter, e.g., a Kalman filter or autoencoder, for denoising the data to remove or at least reduce noise before the data is trained inside the DNN and stochastic optimization, e.g., Bayesian optimization (BO) as described above, is applied.

Figure 10:
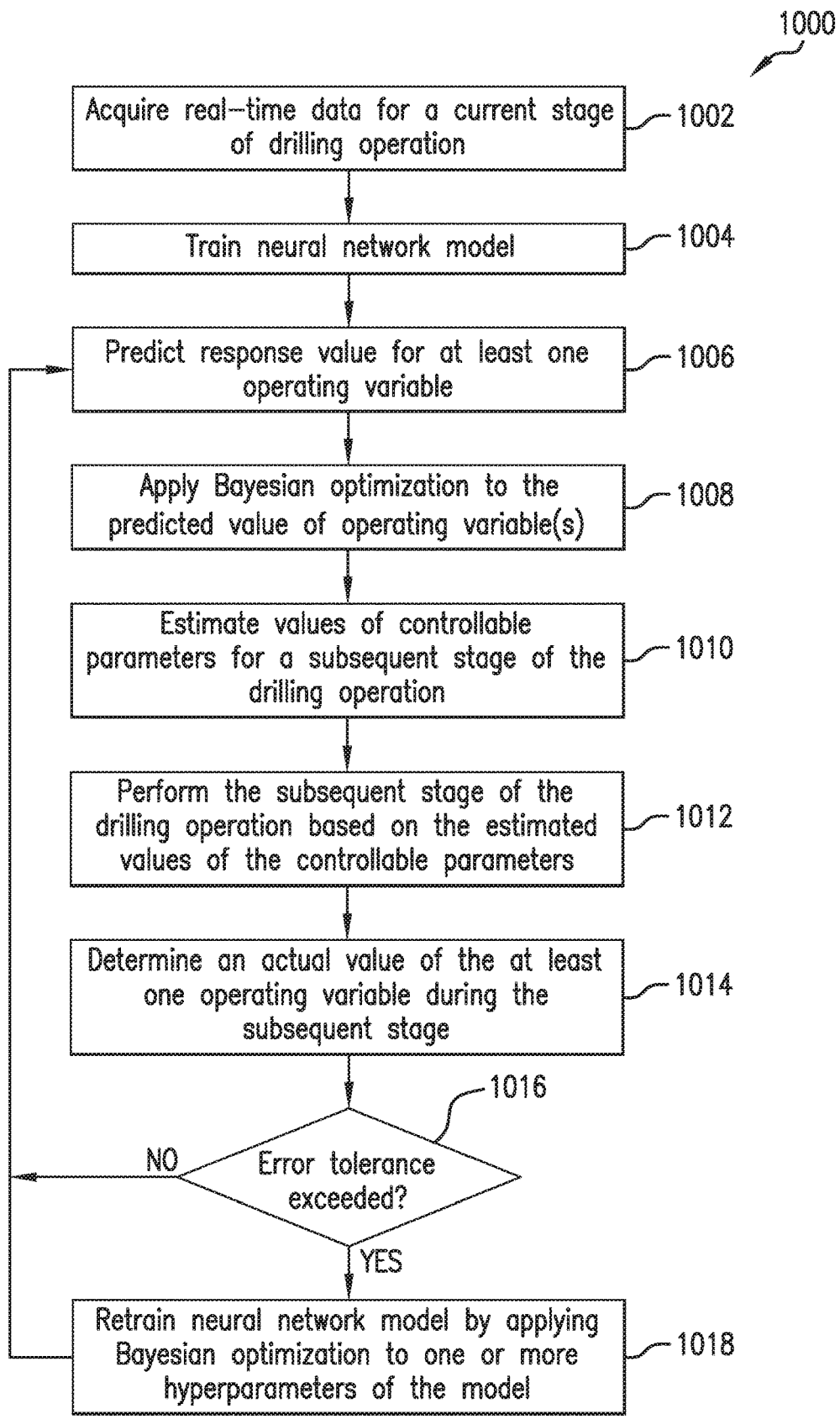
FIG. 10 is a flowchart of an illustrative process of optimizing downhole parameters with a real-time neural network model for well planning and control during different stages of a drilling operation.

FIG. 10 is a flowchart of an illustrative process 1000 of optimizing drilling parameters using a neural network model for real-time well planning and control over different stages of a drilling operation along a well path. For discussion purposes, process 1000 will be described using system 300 of FIG. 3, as described above. However, process 1000 is not intended to be limited thereto. Also, for discussion purposes, process will be described using drilling systems 100 and 200 of FIGS. 1 and 2, respectively, but is not intended to be limited thereto. The operations in blocks 1002, 1004, 1006, 1008, 1010, 1012, 1014, 1016, and 1018 of process 1000 may be performed by, for example, one or more components of well planner 310 of system 300, as described above.

Process 1000 begins at block 1002, which includes acquiring real-time data, including values for a plurality of input variables, for a current stage of a drilling operation along a planned path of a wellbore within a subsurface formation.

In block 1004, a neural network model is trained to produce an objective function defining a response value of at least one operating variable to be optimized during the drilling operation along the planned path, based on the real-time data acquired in block 1002. In one or more embodiments, the operating variable may be selected by a user, e.g., user 302 of system 300 of FIG. 3, as described above. Thus, while not shown in FIG. 10, block 1002 or 1004 may also include receiving input from the user (e.g., via GUI 330 of FIG. 3) with the user's selection of the operating variable. The selected operating variable may be, for example and without limitation, ROP and/or HMSE.

In block 1006, a response value for the at least one operating variable is estimated, based on the objective function produced by the trained neural network model.

Process 1000 then proceeds to block 1008, which includes applying Bayesian optimization to the response value defined by the objective function such that the trained neural network model produces an optimized response value for the at least one operating variable.

In block 1010, the optimized response value of the operating variable is used to estimate values of a plurality of controllable parameters for a subsequent stage of the drilling operation.

In block 1012, the subsequent stage of the drilling operation is performed based on the estimated values of the plurality of controllable parameters.

In block 1014, an actual value of the operating variable may be determined during the subsequent stage (based on additional data acquired during this stage) and process 1000 may proceed to block 1016.

Block 1016 may include determining whether a difference between the actual value of the at least one operating variable and the response value, as estimated and optimized in blocks 1006 and 1008, respectively, exceeds an error tolerance threshold. When the difference is determined to exceed the error threshold, process 1000 proceeds to block 1018, which includes retraining the neural network model by applying stochastic optimization (e.g., Bayesian optimization) to one or more hyperparameters of the model, as described above. Process 1000 then returns to block 1006 and the above-described operations in blocks 1006, 1008, 1010, 1012, 1014 and 1016 may be repeated for the next stage of the drilling operation using the retrained neural network model. Otherwise, process 1000 may return to block 1006 directly from block 1016 so that the operations in the above-described blocks may be repeated for the next stage of the drilling operation using the previously trained model.

Figure 11A:
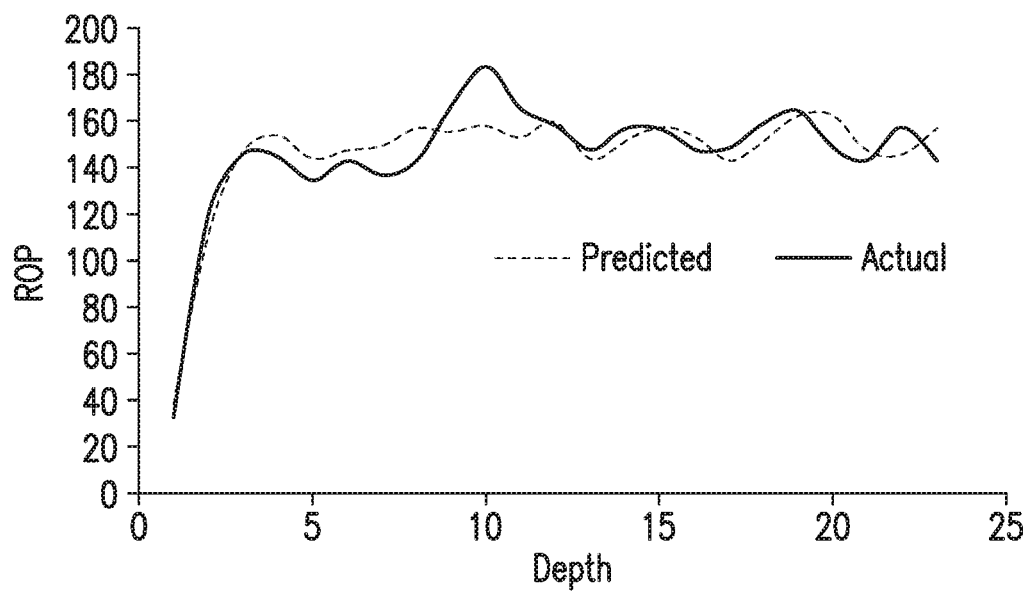
FIGS. 11A, 11B, 11C and 11D are plot graphs showing values of rate of penetration (ROP) as predicted using a SWNN model relative to the actual ROP values along a well path.
Figure 11B:
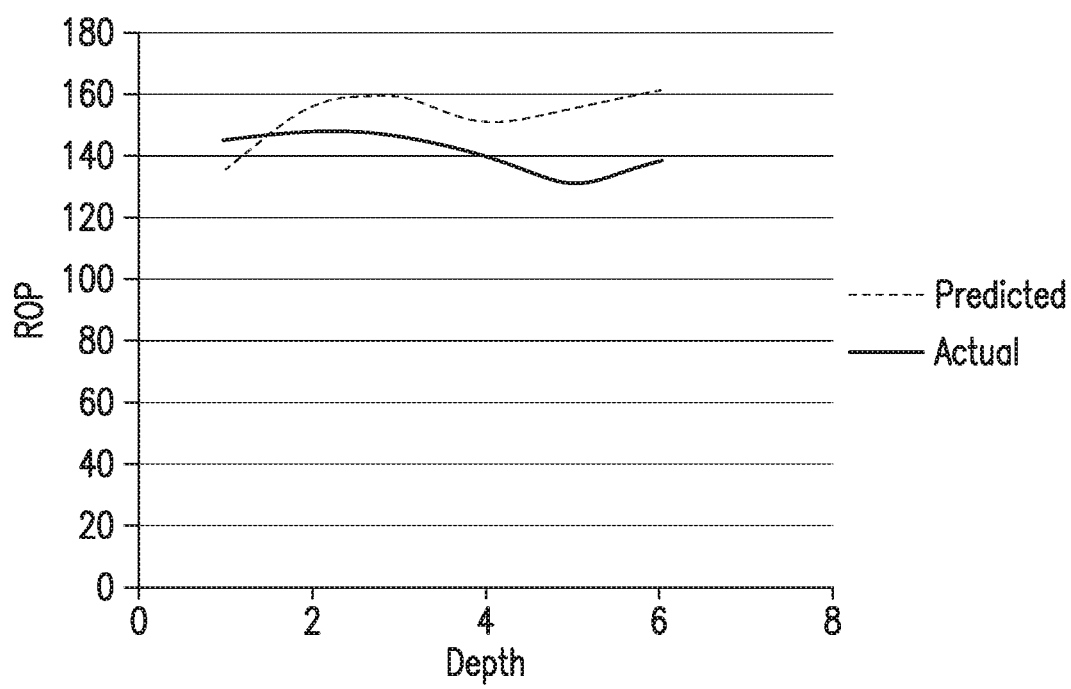
Figure 11C:
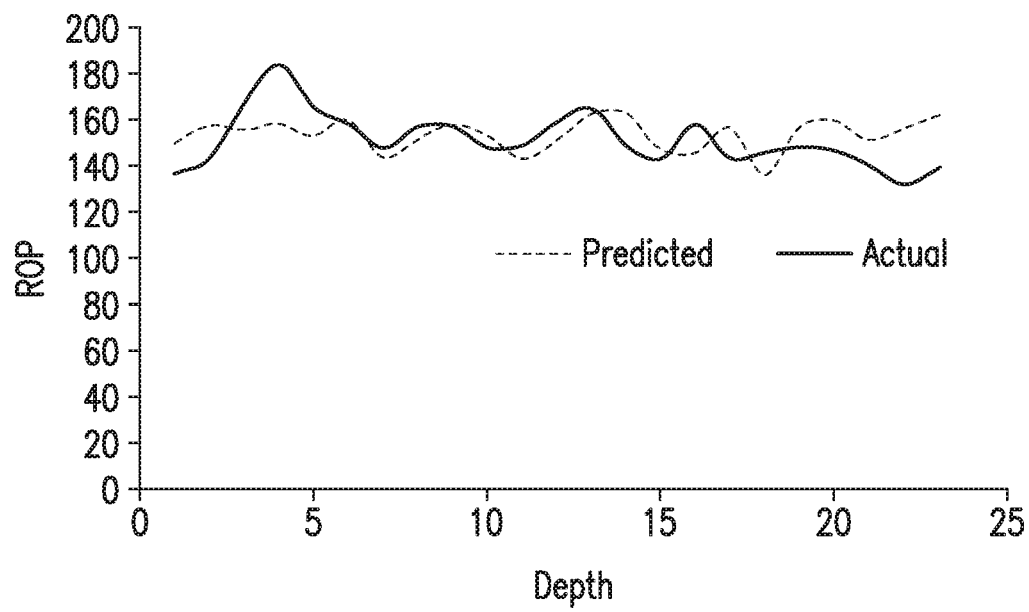
Figure 11D:
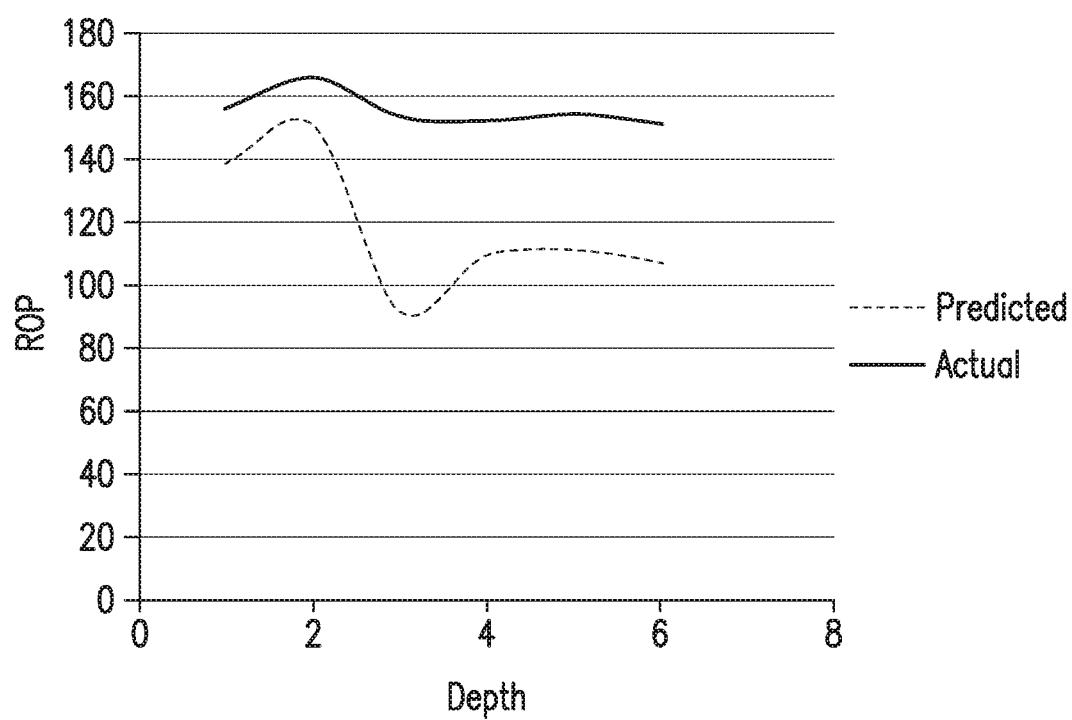

FIGS. 11A, 11B, 11C and 11D are plot graphs showing values of rate of penetration (ROP) as predicted using a SWNN model relative to the actual ROP values along a well path as a function of depth. The size of the sliding window of the SWNN used for the predictions in the example shown in FIGS. 11A and 11B as well as for the example shown in FIGS. 11C and 11D is assumed to be 30 feet, where the values for the first 24 feet of each window (e.g., as shown in each of FIGS. 11A and 11C) are used for training the SWNN and the values for the next or last 6 feet of the window (as shown in each of FIGS. 11B and 11D) are used for testing the model's predictions and retraining the model if necessary. It may also be assumed for purposes of this example that no retraining of the SWNN was required, e.g., because the predictions produced by the SWNN met the retraining criterion or error tolerance threshold. For example, the retraining criterion or error threshold may be a specified root mean square error value (e.g., 0.2), and the difference between an actual value of the operating variable and the response value predicted using the SWNN may be less than this root mean square error value.

Figure 12A:
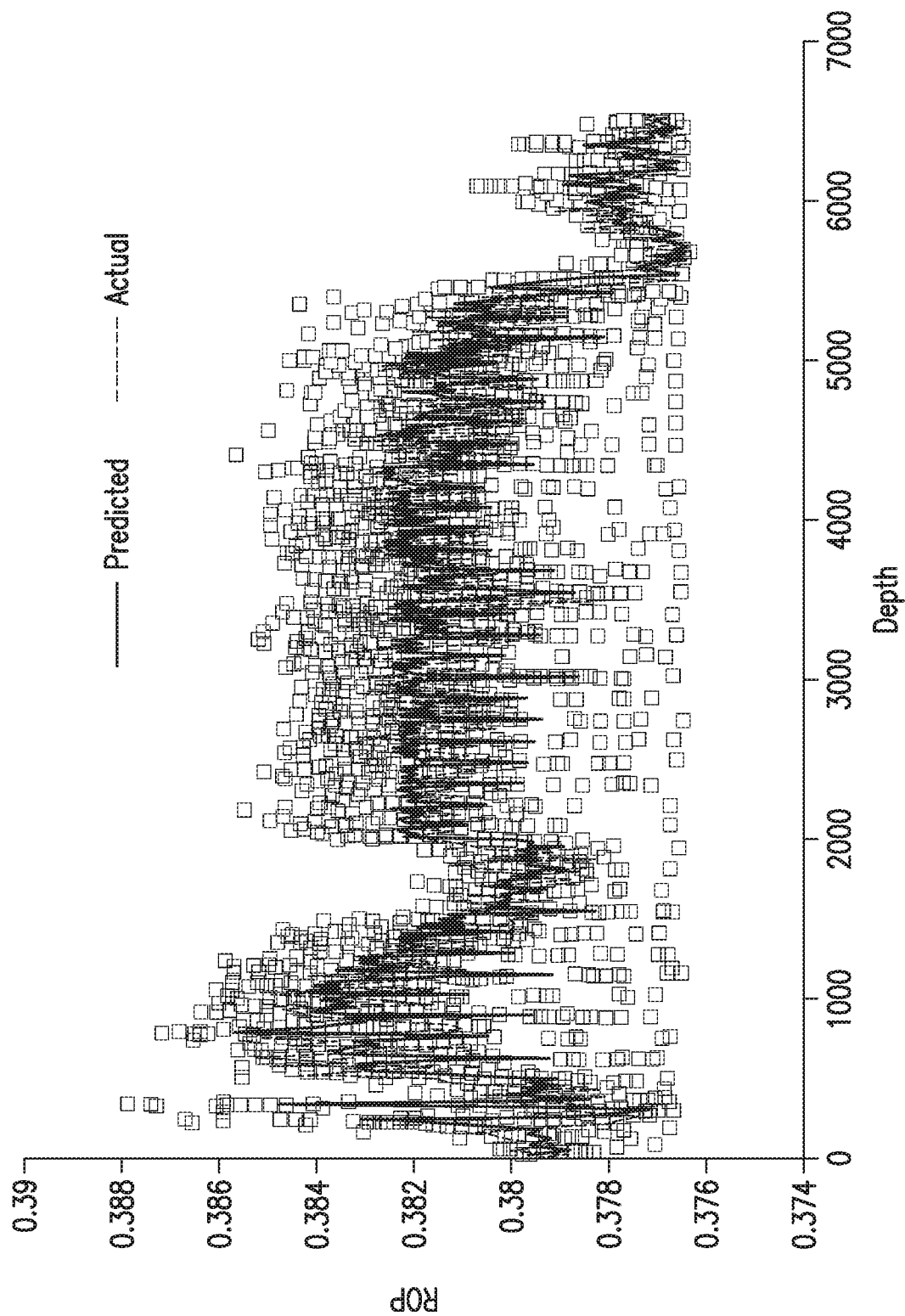
FIGS. 12A and 12B are plot graphs showing a comparison between predicted and actual ROP values along a well path, where the predicted values are based on a recurrent DNN with and without a noise filter, respectively.
Figure 12B:
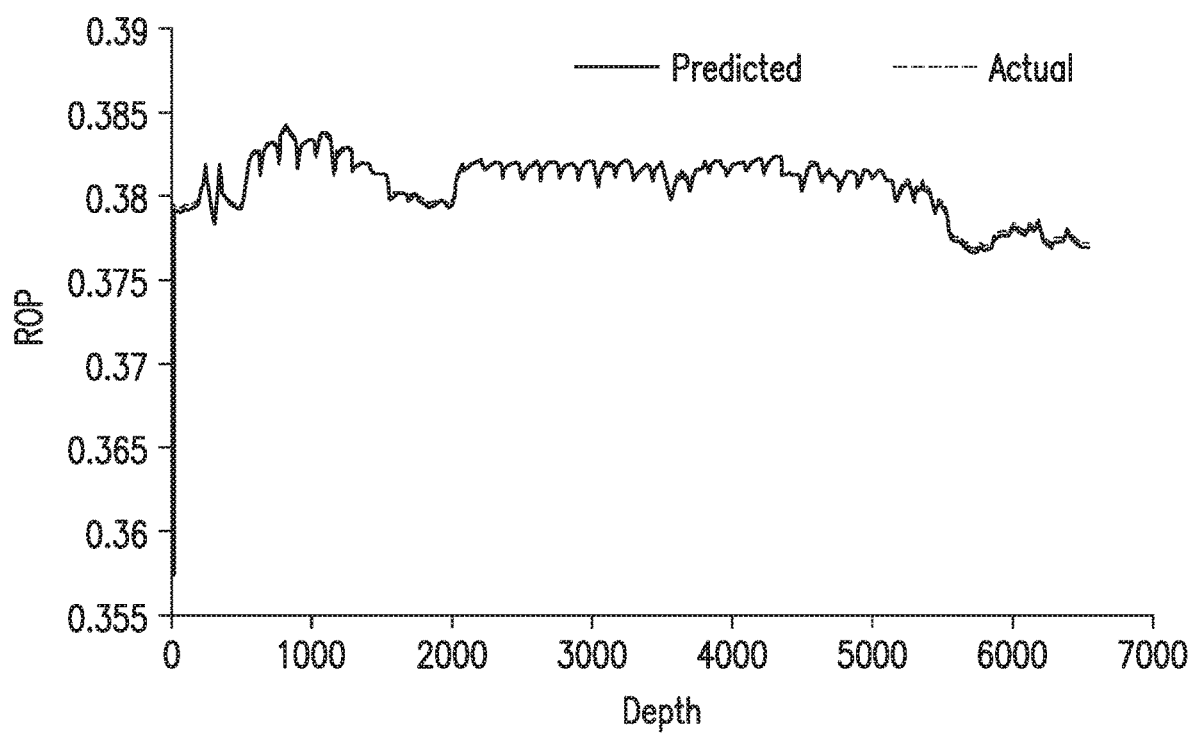

FIGS. 12A and 12B are plot graphs showing a comparison between predicted ROP values and normalized actual ROP values along a well path over depth (e.g., in feet), where the predicted values are based on a recurrent DNN with and without a noise filter, respectively. As shown by the plot graph in each of FIGS. 12A and 12B, the predicted values tend to be much closer to the actual values when a noise filter, e.g., a Kalman filter or denoising autoencoder, is used. The use of such a filter to produce more accurate predictions of ROP in this example may also indicate that a number of input variables may be unknown or missing. Accordingly, the accuracy and/or efficiency of the DNN model for predicting the ROP response in this example may be further improved by increasing the number of input variables that are used to appropriately train or retrain the model. For example, the model may be retrained using additional input variables, e.g., reservoir properties or other information relating to the characteristics of the subsurface formation, which may affect ROP during a drilling operation.

While the various embodiments are described herein in the context of surface computer systems, it should be noted that the disclosed modeling and parameter optimization techniques are not intended to be limited thereto. In one or more embodiments, some or all of the calculations related to the operating variable and/or the controllable parameters may be performed by a processor within a downhole tool disposed within the wellbore proximate to the drill bit. For example, the telemetry module 124 of FIGS. 1 and 2, as described above, may include a computer system for performing such calculations downhole. The telemetry module 124 may include an encoding system, such as a mud pulser, for communicating (e.g., via telemetry) some or all the calculation results to the surface computer systems. In cases where control of the operational parameter is automated, the telemetry module 124 or other downhole computer system (e.g., a downhole geosteering tool) coupled thereto may be used automatically control or change one or more controllable parameters (e.g., the RPM or speed of the mud motor 112, WOB, and/or fluid injection/flow rate).

Figure 13:
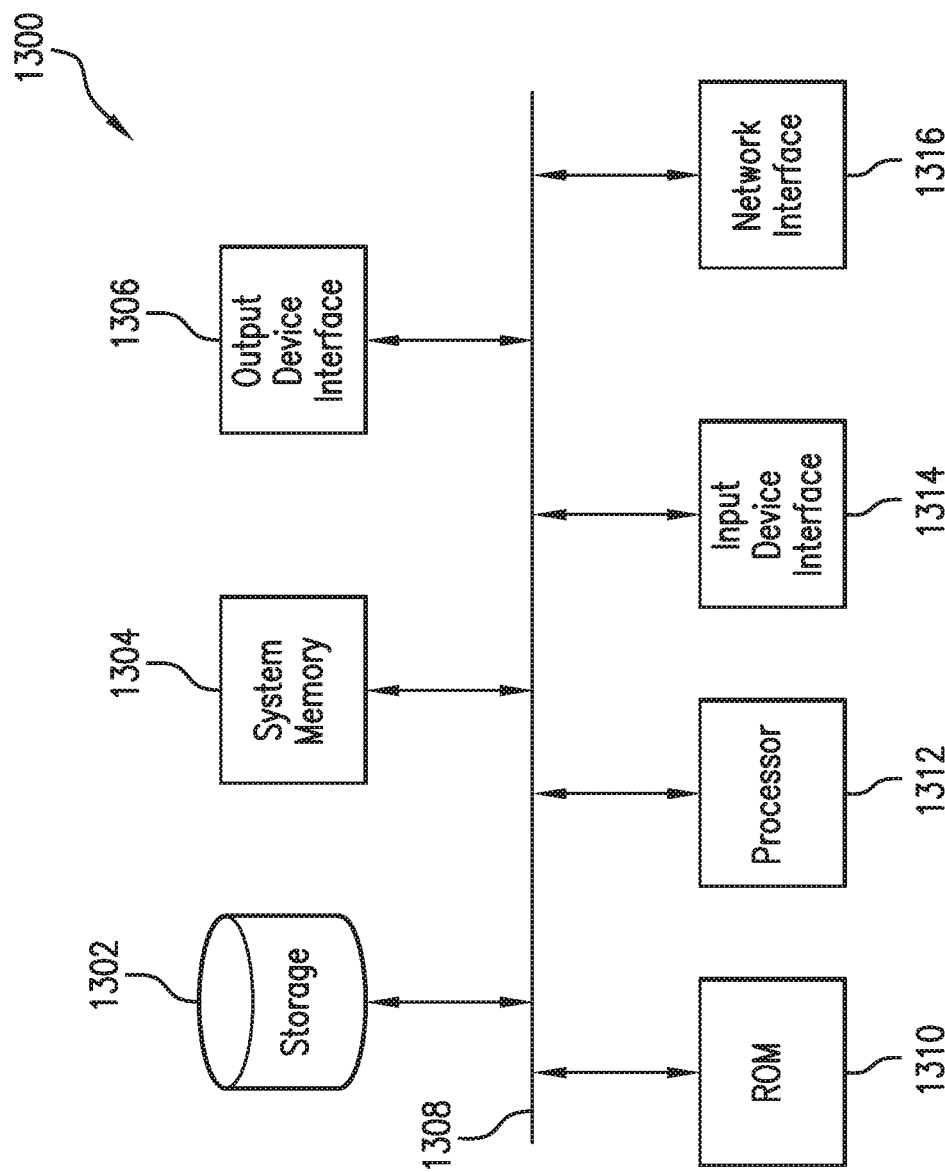
FIG. 13 is a block diagram of an illustrative computer system in which one or more embodiments may be implemented.

FIG. 13 is a block diagram of an illustrative computer system 1300 in which embodiments of the present disclosure may be implemented. For example, process 1000 of FIG. 10 and the functions performed by system 300 (including well planner 310) of FIG. 3, as described above, may be implemented using system 1300. System 1300 can be a computer, phone, PDA, or any other type of electronic device. Such an electronic device includes various types of computer readable media and interfaces for various other types of computer readable media. As shown in FIG. 13, system 1300 includes a permanent storage device 1302, a system memory 1304, an output device interface 1306, a system communications bus 1308, a read-only memory (ROM) 1310, processing unit(s) 1312, an input device interface 1314, and a network interface 1316.

Bus 1308 collectively represents all system, peripheral, and chipset buses that communicatively connect the numerous internal devices of system 1300. For instance, bus 1308 communicatively connects processing unit(s) 1312 with ROM 1310, system memory 1304, and permanent storage device 1302.

From these various memory units, processing unit(s) 1312 retrieves instructions to execute and data to process in order to execute the processes of the subject disclosure. The processing unit(s) can be a single processor or a multi-core processor in different implementations.

ROM 1310 stores static data and instructions that are needed by processing unit(s) 1312 and other modules of system 1300. Permanent storage device 1302, on the other hand, is a read-and-write memory device. This device is a non-volatile memory unit that stores instructions and data even when system 1300 is powered off. Some implementations of the subject disclosure use a mass-storage device (such as a magnetic or optical disk and its corresponding disk drive) as permanent storage device 1302.

Other implementations use a removable storage device (such as a floppy disk, flash drive, and its corresponding disk drive) as permanent storage device 1302. Like permanent storage device 1302, system memory 1304 is a read-and-write memory device. However, unlike storage device 1302, system memory 1304 is a volatile read-and-write memory, such a random access memory. System memory 1304 stores some of the instructions and data that the processor needs at runtime. In some implementations, the processes of the subject disclosure are stored in system memory 1304, permanent storage device 1302, and/or ROM 1310. For example, the various memory units include instructions for computer aided pipe string design based on existing string designs in accordance with some implementations. From these various memory units, processing unit(s) 1312 retrieves instructions to execute and data to process in order to execute the processes of some implementations.

Bus 1308 also connects to input and output device interfaces 1314 and 1306. Input device interface 1314 enables the user to communicate information and select commands to the system 1300. Input devices used with input device interface 1314 include, for example, alphanumeric, QWERTY, or T9 keyboards, microphones, and pointing devices (also called "cursor control devices"). Output device interfaces 1306 enables, for example, the display of images generated by the system 1300. Output devices used with output device interface 1306 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 13, bus 1308 also couples system 1300 to a public or private network (not shown) or combination of networks through a network interface 1316. Such a network may include, for example, a local area network ("LAN"), such as an Intranet, or a wide area network ("WAN"), such as the Internet. Any or all components of system 1300 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, process 1000 of FIG. 10 and the functions or operations performed by system 300 of FIG. 3, as described above, may be implemented using system 1300 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for real-time optimization of parameters during drilling operations. In one embodiment of the present disclosure, a computer-implemented method of optimizing parameters for drilling operations includes: acquiring real-time data including values for a plurality of input variables associated with a current stage of a drilling operation along a planned path of a wellbore within a subsurface formation; training a neural network model to produce an objective function defining a response value for at least one operating variable to be optimized during the drilling operation along the planned path, based on the acquired real-time data; estimating the response value for the at least one operating variable, based on the objective function produced by the trained neural network model; applying stochastic optimization to the estimated response value so as to produce an optimized response value for the at least one operating variable; estimating values of a plurality of controllable parameters for a subsequent stage of the drilling operation, based on the optimized response value of the at least one operating variable; and performing the subsequent stage of the drilling operation based on the estimated values of the plurality of controllable parameters. In another embodiment of the present disclosure, a computer-readable storage medium having instructions stored therein is disclosed, where the instructions, when executed by a computer, cause the computer to perform a plurality of functions, including functions to: acquire real-time data including values for a plurality of input variables associated with a current stage of a drilling operation along a planned path of a wellbore within a subsurface formation; train a neural network model to produce an objective function defining a response value for at least one operating variable to be optimized during the drilling operation along the planned path, based on the acquired real-time data; estimate the response value for the at least one operating variable, based on the objective function produced by the trained neural network model; apply stochastic optimization to the estimated response value so as to produce an optimized response value for the at least one operating variable; estimate values of a plurality of controllable parameters for a subsequent stage of the drilling operation, based on the optimized response value of the at least one operating variable; and perform the subsequent stage of the drilling operation based on the estimated values of the plurality of controllable parameters.

In one or more embodiments of the foregoing method and/or computer-readable storage medium: the at least one operating variable is at least one of a rate of penetration (ROP) or a hydraulic mechanical specific energy (HMSE), the stochastic optimization is Bayesian optimization, and the optimized response value is at least one of a maximum value for the ROP or a minimum value for the HMSE; the values for the plurality of input variables are initial values for the plurality of controllable parameters associated with the current stage of the drilling operation; the plurality of controllable parameters include weight-on-bit (WOB), a rotational speed of a drill bit, and a pumping rate of drilling fluid; the neural network model is a sliding window neural network (SWNN); the neural network model is a recurrent deep neural network (DNN); and the recurrent DNN includes at least one of a Gated Recurrent Unit (GRU) cell or a Long Short Term Memory (LSTM) cell. Furthermore, one or more embodiments of the foregoing method and/or computer-readable storage medium may include any one or any combination of the following additional elements, functions, or operations: determining an actual value of the at least one operating variable during the subsequent stage of the drilling operation, determining whether a difference between the actual value and the estimated value of the at least one operating variable exceeds an error tolerance, and retraining the neural network model when the difference is determined to exceed the error tolerance; retraining by applying Bayesian optimization to one or more hyperparameters of the neural network model; training by filtering noise from the real-time data and training the recurrent DNN based on the filtered real-time data; and filtering by applying the real-time data as input to a convolution neural network and passing output data including a previously estimated response value of the at least one operating variable through a Kalman filter, and training the recurrent DNN by training the recurrent DNN based on an output of the convolutional neural network and an output of the Kalman filter.

In yet another embodiment of the present disclosure, a system includes at least one processor and a memory coupled to the processor having instructions stored therein, which when executed by the processor, cause the processor to perform functions including functions to: acquire real-time data including values for a plurality of input variables associated with a current stage of a drilling operation along a planned path of a wellbore within a subsurface formation; train a neural network model to produce an objective function defining a response value for at least one operating variable to be optimized during the drilling operation along the planned path, based on the acquired real-time data; estimate the response value for the at least one operating variable, based on the objective function produced by the trained neural network model; apply stochastic optimization to the estimated response value so as to produce an optimized response value for the at least one operating variable; estimate values of a plurality of controllable parameters for a subsequent stage of the drilling operation, based on the optimized response value of the at least one operating variable; and perform the subsequent stage of the drilling operation based on the estimated values of the plurality of controllable parameters.

In one or more embodiments of the foregoing system: the at least one operating variable is at least one of a rate of penetration (ROP) or a hydraulic mechanical specific energy (HMSE), the stochastic optimization is Bayesian optimization, and the optimized response value is at least one of a maximum value for the ROP or a minimum value for the HMSE; the values for the plurality of input variables are initial values for the plurality of controllable parameters associated with the current stage of the drilling operation; the plurality of controllable parameters include weight-on-bit (WOB), a rotational speed of a drill bit, and a pumping rate of drilling fluid; the neural network model is a sliding window neural network (SWNN); the neural network model is a recurrent deep neural network (DNN); and the recurrent DNN includes at least one of a Gated Recurrent Unit (GRU) cell or a Long Short Term Memory (LSTM) cell. Furthermore, in one or more embodiments of the foregoing system, the functions performed by the processor may further include functions to: determine an actual value of the at least one operating variable during the subsequent stage of the drilling operation; determine whether a difference between the actual value and the estimated value of the at least one operating variable exceeds an error tolerance; retrain the neural network model when the difference is determined to exceed the error tolerance; apply Bayesian optimization to one or more hyperparameters of the neural network model; filter noise from the real-time data; train the recurrent DNN based on the filtered real-time data; apply the real-time data as input to a convolution neural network; pass output data including a previously estimated response value of the at least one operating variable through a Kalman filter; and train the recurrent DNN based on an output of the convolutional neural network and an output of the Kalman filter.

While specific details about the above embodiments have been described, the above hardware and software descriptions are intended merely as example embodiments and are not intended to limit the structure or implementation of the disclosed embodiments. For instance, although many other internal components of the system 1300 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of optimizing parameters for drilling operations, the method comprising:
    acquiring real-time data over a current stage of a drilling operation along a planned path of a wellbore within a subsurface formation, the real-time data including values for a plurality of controllable parameters of the drilling operation;
    applying the acquired real-time data as inputs to a plurality of data models corresponding to the plurality of controllable parameters to determine one or more constraints for each controllable parameter;
    training a neural network model to produce an objective function defining a response value for at least one operating variable to be optimized during the drilling operation along the planned path, based on the acquired real-time data and the one or more constraints determined for each controllable parameter by a corresponding data model;
    estimating the response value for the at least one operating variable, based on the objective function produced by the trained neural network model;
    applying stochastic optimization to the estimated response value so as to produce an optimized response value for the at least one operating variable;
    estimating values of a plurality of controllable parameters for a subsequent stage of the drilling operation, based on the optimized response value of the at least one operating variable; and
    performing the subsequent stage of the drilling operation based on the estimated values of the plurality of controllable parameters.

2. The method of claim 1, wherein the at least one operating variable is at least one of a rate of penetration (ROP) or a hydraulic mechanical specific energy (HMSE), the stochastic optimization is Bayesian optimization, and the optimized response value is at least one of a maximum value for the ROP or a minimum value for the HMSE.

3. The method of claim 1, wherein the values for the plurality of controllable parameters are current values of the controllable parameters associated with the current stage of the drilling operation.

4. The method of claim 1, wherein the plurality of controllable parameters include weight-on-bit (WOB), a rotational speed of a drill bit, and a pumping rate of drilling fluid.

5. The method of claim 1, further comprising:
determining an actual value of the at least one operating variable during the subsequent stage of the drilling operation;
determining whether a difference between the actual value and the estimated value of the at least one operating variable exceeds an error tolerance; and
when the difference is determined to exceed the error tolerance, retraining the neural network model.

6. The method of claim 5, wherein retraining comprises:
applying Bayesian optimization to one or more hyperparameters of the neural network model.

7. The method of claim 6, wherein the neural network model is at least one of a sliding window neural network (SWNN) or a recurrent deep neural network (DNN).

8. The method of claim 7, wherein the recurrent DNN includes at least one of a Gated Recurrent Unit (GRU) cell or a Long Short Term Memory (LSTM) cell.

9. The method of claim 7, wherein training comprises:
filtering noise from the real-time data; and
training the recurrent DNN based on the filtered real-time data.

10. The method of claim 9, wherein filtering comprises:
applying the real-time data as input to a convolution neural network; and
passing output data including a previously estimated response value of the at least one operating variable through a Kalman filter, and wherein training the recurrent DNN comprises:
training the recurrent DNN based on an output of the convolutional neural network and an output of the Kalman filter.

11. A system comprising:
at least one processor; and
a memory coupled to the processor having instructions stored therein, which when executed by the processor, cause the processor to perform a plurality of functions, including functions to:
acquire real-time data over a current stage of a drilling operation along a planned path of a wellbore within a subsurface formation, the real-time data including values for a plurality of controllable parameters of the drilling operation;
apply the acquired real-time data as inputs to a plurality of data models corresponding to the plurality of controllable parameters to determine one or more constraints for each controllable parameter;
train a neural network model to produce an objective function defining a response value for at least one operating variable to be optimized during the drilling operation along the planned path, based on the acquired real-time data and the one or more constraints determined for each controllable parameter by a corresponding data model;
estimate the response value for the at least one operating variable, based on the objective function produced by the trained neural network model;
apply stochastic optimization to the estimated response value so as to produce an optimized response value for the at least one operating variable;
estimate values of a plurality of controllable parameters for a subsequent stage of the drilling operation, based on the optimized response value of the at least one operating variable; and
perform the subsequent stage of the drilling operation based on the estimated values of the plurality of controllable parameters.

12. The system of claim 11, wherein the at least one operating variable is at least one of a rate of penetration (ROP) or a hydraulic mechanical specific energy (HMSE), the stochastic optimization is Bayesian optimization, and the optimized response value is at least one of a maximum value for the ROP or a minimum value for the HMSE.

13. The system of claim 11, wherein the values for the plurality of controllable parameters are current values of the controllable parameters associated with the current stage of the drilling operation, and the plurality of controllable parameters include weight-on-bit (WOB), a rotational speed of a drill bit, and a pumping rate of drilling fluid.

14. The system of claim 11, wherein the functions performed by the processor further include functions to:
determine an actual value of the at least one operating variable during the subsequent stage of the drilling operation;
determine whether a difference between the actual value and the estimated value of the at least one operating variable exceeds an error tolerance; and
retrain the neural network model when the difference is determined to exceed the error tolerance.

15. The system of claim 14, wherein the neural network model is retrained by applying Bayesian optimization to one or more hyperparameters of the neural network model, and the one or more hyperparameters are selected from the group consisting of: a number of layers of the neural network model; a number of nodes in each layer of the neural network model; and a learning rate of decay of the neural network model.

16. The system of claim 15, wherein the neural network model is at least one of a sliding window neural network (SWNN) or a recurrent deep neural network (DNN).

17. The system of claim 16, wherein the recurrent DNN includes at least one of a Gated Recurrent Unit (GRU) cell or a Long Short Term Memory (LSTM) cell.

18. The system of claim 16, wherein the functions performed by the processor further include functions to filter noise from the real-time data, and the recurrent DNN is trained based on the filtered real-time data.

19. The system of claim 18, wherein the functions performed by the processor further include functions to:
apply the real-time data as input to a convolution neural network;
pass output data including a previously estimated response value of the at least one operating variable through a Kalman filter; and
train the recurrent DNN based on an output of the convolutional neural network and an output of the Kalman filter.

20. A computer-readable storage medium having instructions stored therein, which when executed by a computer cause the computer to perform a plurality of functions, including functions to:
acquire real-time data over a current stage of a drilling operation along a planned path of a wellbore within a subsurface formation, the real-time data including values for a plurality of controllable parameters of the drilling operation;

apply the acquired real-time data as inputs to a plurality of data models corresponding to the plurality of controllable parameters to determine one or more constraints for each controllable parameter;

train a neural network model to produce an objective function defining a response value for at least one operating variable to be optimized during the drilling operation along the planned path, based on the acquired real-time data and the one or more constraints determined for each controllable parameter by a corresponding data model;

estimate the response value for the at least one operating variable, based on the objective function produced by the trained neural network model;

apply stochastic optimization to the estimated response value so as to produce an optimized response value for the at least one operating variable;

estimate values of a plurality of controllable parameters for a subsequent stage of the drilling operation, based on the optimized response value of the at least one operating variable; and perform the subsequent stage of the drilling operation based on the estimated values of the plurality of controllable parameters.

* * * * *